US 9,644,803 B2

(12) United States Patent
Kasugai et al.

(10) Patent No.: US 9,644,803 B2
(45) Date of Patent: May 9, 2017

(54) LIGHT SOURCE AND IMAGE PROJECTION APPARATUS

(71) Applicant: Panasonic Intellectual Property Management Co., Ltd., Osaka (JP)

(72) Inventors: Hideki Kasugai, Shiga (JP); Kazuhiko Yamanaka, Osaka (JP); Kiyoshi Morimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 91 days.

(21) Appl. No.: 14/693,909

(22) Filed: Apr. 23, 2015

(65) Prior Publication Data
US 2015/0226389 A1 Aug. 13, 2015

Related U.S. Application Data

(63) Continuation of application No. PCT/JP2013/004688, filed on Aug. 2, 2013.

(30) Foreign Application Priority Data

Nov. 7, 2012 (JP) ................................ 2012-245032

(51) Int. Cl.
*F21K 99/00* (2016.01)
*G02B 26/00* (2006.01)
(Continued)

(52) U.S. Cl.
CPC ................. *F21K 9/56* (2013.01); *F21V 9/16* (2013.01); *F21V 14/08* (2013.01); *G02B 5/3025* (2013.01);
(Continued)

(58) Field of Classification Search
CPC .. G03B 21/28; G03B 21/204; G03B 21/2033; G03B 21/2066; F21V 13/08; F21V 13/14
See application file for complete search history.

(56) References Cited

U.S. PATENT DOCUMENTS 6,187,225 B1 * 2/2001 Rao .................... C09K 11/7734
252/301.4 H
2010/0245777 A1 9/2010 Ogura
(Continued)

FOREIGN PATENT DOCUMENTS

| CN | 102645825 | 8/2012 |
| JP | 11-064789 | 3/1999 |

(Continued)

OTHER PUBLICATIONS

International Search Report of PCT application No. PCT/JP2013/004688 dated Sep. 17, 2013.
(Continued)

*Primary Examiner* — Sultan Chowdhury
(74) *Attorney, Agent, or Firm* — McDermott Will & Emery LLP

(57) ABSTRACT

In a light source in which a semiconductor luminescence element and a phosphor are combined, red light having high color purity is efficiently radiated. The light source includes: a semiconductor luminescence element; a fixed or rotatable first wavelength converting unit; and a rotatable second wavelength converting unit. The second wavelength converting unit includes: a second wavelength converting region that absorbs output light emitted from the semiconductor luminescence element and radiates light having a second wavelength different from that of the output light; and a transmission region that transmits the output light. The first wavelength converting unit absorbs the output light to radiate light having a first wavelength longer than the second
(Continued)

wavelength of the light, and the light having the first wavelength is transmitted through the transmission region.

52 Claims, 35 Drawing Sheets

(51) Int. Cl.
*G03B 21/20* (2006.01)
*G03B 33/08* (2006.01)
*H04N 9/31* (2006.01)
*F21V 9/16* (2006.01)
*F21V 14/08* (2006.01)
*G02B 5/30* (2006.01)
*G02B 27/14* (2006.01)

(52) U.S. Cl.
CPC ......... *G02B 26/008* (2013.01); *G02B 27/141* (2013.01); *G03B 21/204* (2013.01); *G03B 33/08* (2013.01); *H04N 9/3114* (2013.01); *H04N 9/3158* (2013.01); *G03B 21/2073* (2013.01)

(56) References Cited

U.S. PATENT DOCUMENTS

| | | | |
|---|---|---|---|
| 2010/0315604 A1* | 12/2010 | Peeters | G02B 26/008 353/84 |
| 2011/0075103 A1 | 3/2011 | Ogawa et al. | |
| 2011/0234923 A1 | 9/2011 | Yamagishi et al. | |
| 2011/0317131 A1 | 12/2011 | Miyazaki | |
| 2012/0044465 A1* | 2/2012 | Murai | G03B 21/204 353/85 |
| 2012/0062857 A1 | 3/2012 | Saitou et al. | |
| 2012/0075591 A1 | 3/2012 | Ogura et al. | |
| 2012/0099082 A1* | 4/2012 | Wang | G03B 21/20 353/31 |
| 2012/0243205 A1* | 9/2012 | Lin | G03B 21/204 362/84 |
| 2013/0100420 A1* | 4/2013 | Ferri | G03B 21/204 353/31 |
| 2013/0229634 A1* | 9/2013 | Hu | H04N 9/3158 353/84 |
| 2013/0329426 A1* | 12/2013 | Finsterbusch | F21V 9/16 362/235 |

FOREIGN PATENT DOCUMENTS

| | | |
|---|---|---|
| JP | 2004-341105 | 12/2004 |
| JP | 2007-322851 | 12/2007 |
| JP | 2009-252651 | 10/2009 |
| JP | 2011-070127 | 4/2011 |
| JP | 2011-221504 | 11/2011 |
| JP | 2012-008409 | 1/2012 |
| JP | 2012-068465 | 4/2012 |
| JP | 2012-068647 | 4/2012 |
| WO | 2011/092841 | 8/2011 |

OTHER PUBLICATIONS

English Translation of Chinese Search Report dated Jan. 28, 2016 for the related Chinese Patent Application No. 201380057851.3.

* cited by examiner

FIG. 4

(a) Time dependence of light intensity of excitation light emitted from semiconductor luminescence element 11

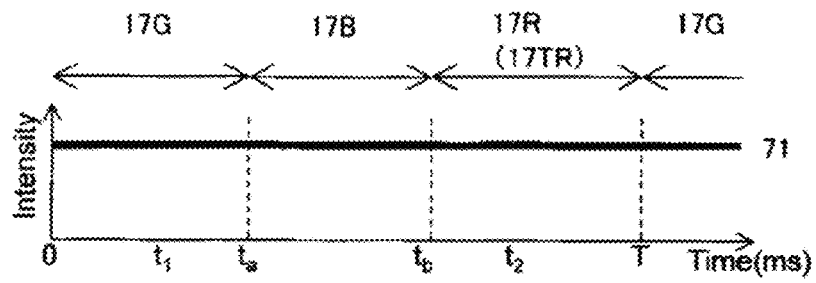

(b) Time dependence of light intensity of wavelength converting light radiated from second fluorescence emission component 17G

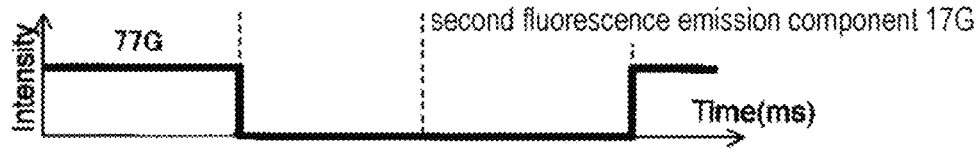

(c) Time dependence of light intensity of wavelength converting light radiated from third fluorescence emission component 17B

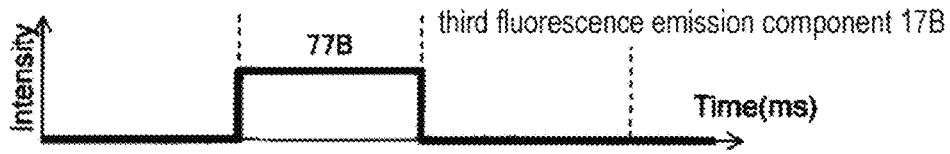

(d) Red light intensity in first fluorescence emission component 17R

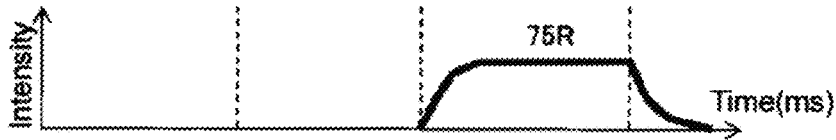

(e) Red light intensity in transmission region 17TR

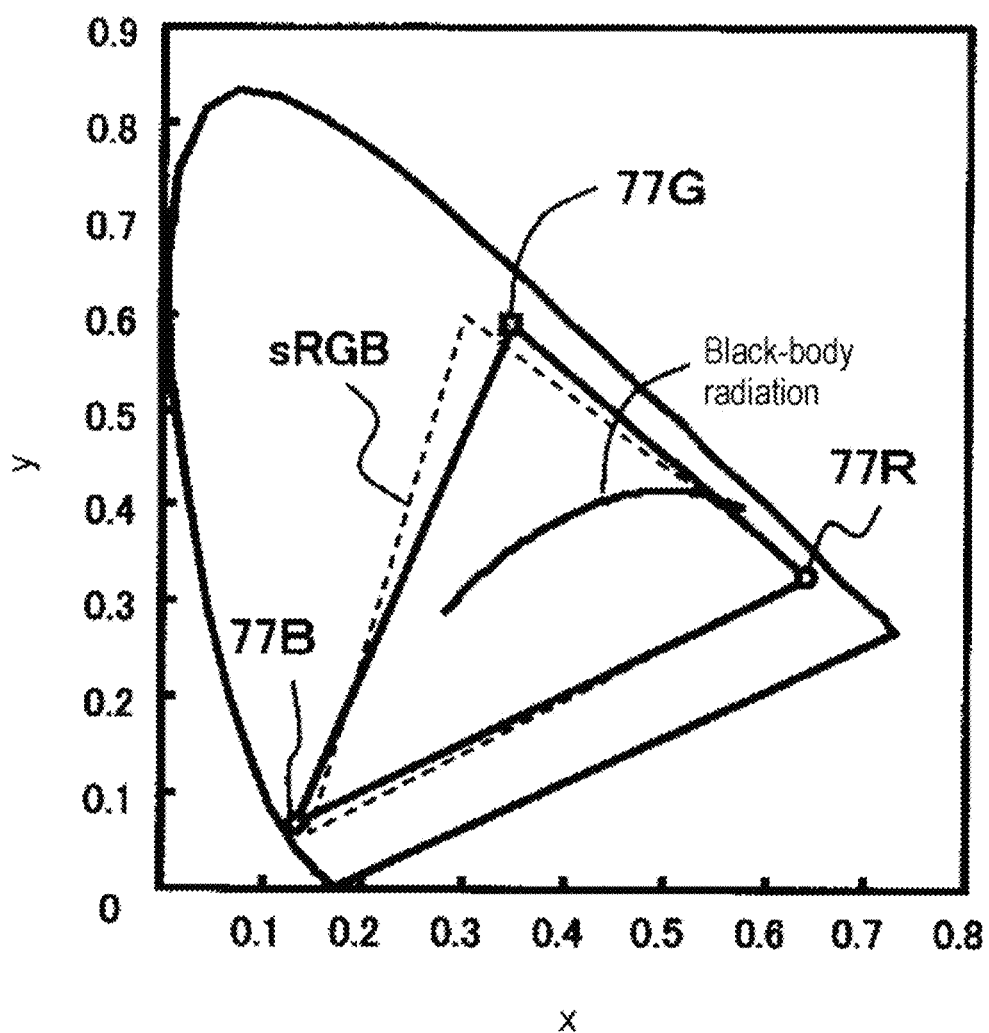

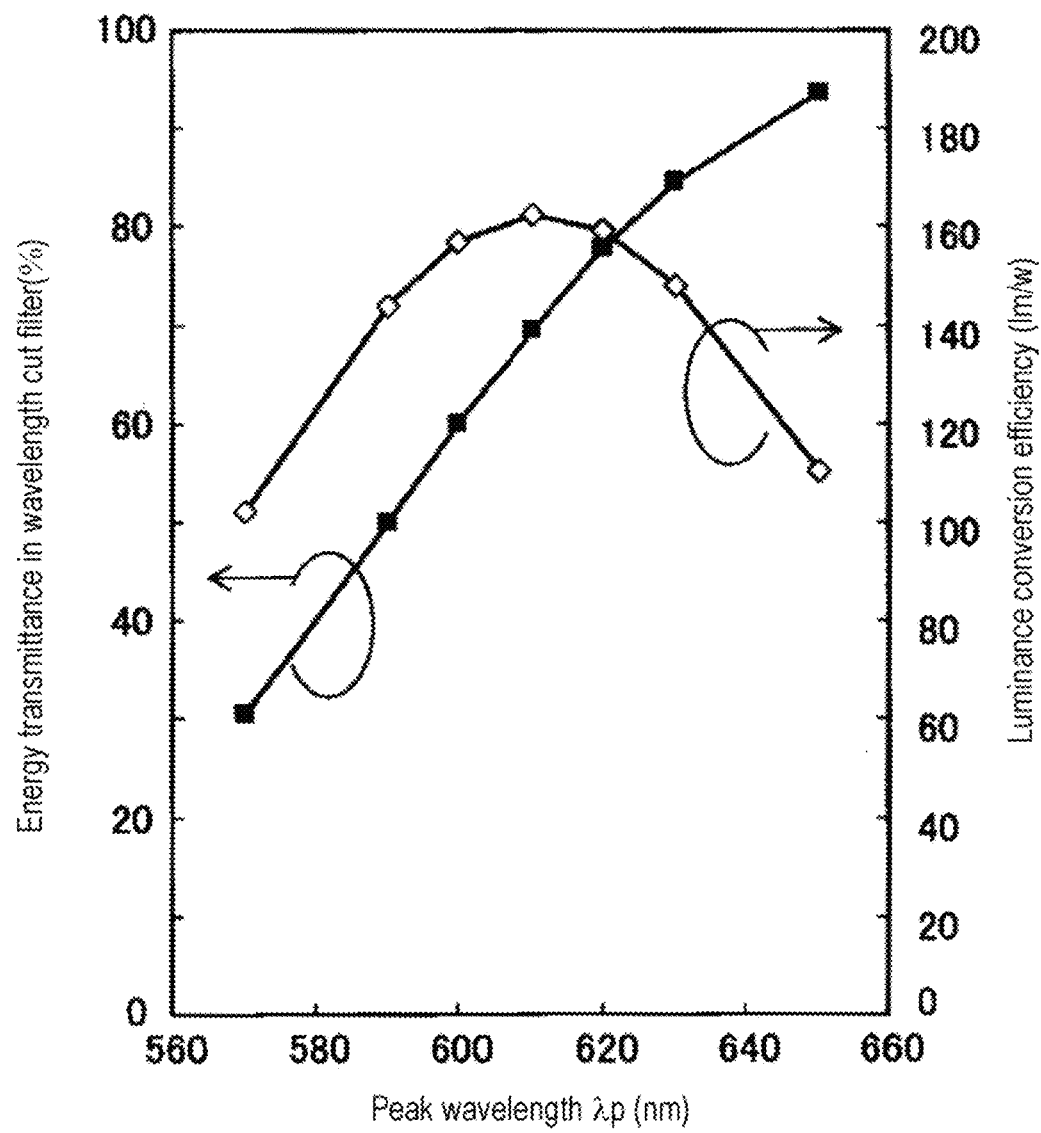

LIGHT SOURCE AND IMAGE PROJECTION APPARATUS

TECHNICAL FIELD

The present invention relates to a light source and an image projection apparatus, which are used in projectors such as a professional-use projector, a home-use projector, and a pico-projector, a rear-projection television set, a headup display, and the like, and particularly relates to a light source having a large light output of output light, a small speckle, and higher directivity of the output light.

BACKGROUND ART

A downlight of a store, a projector light source, a head lamp (such as a headlight) of an automobile and the like are cited as a special lighting source, and a halogen lamp, a high-pressure mercury lamp, a metal halide lamp, and the like are used as these light sources. Among others, an arc discharge is used in high intensity discharge lamps such as the high-pressure mercury lamp and the metal halide lamp, so that light having higher directivity can be radiated with high efficiency and high output. However, these light sources have problems in that time necessary for stabilization after lighting is long, that an environmental load increases because of inclusion of mercury, and that time until luminance defined as a lifetime is reduced to a half is short.

In recent years, there is actively developed the light source in which a semiconductor luminescence element such as a light emitting diode (LED) and a semiconductor laser is used as a component for the light source or an excitation light source. There are proposed various configurations as the configurations of the light source in which the semiconductor luminescence element is used. Examples of the configurations include a configuration using the semiconductor luminescence element in which an emission wavelength is changed in a range of visible light (430 nm to 670 nm) by changing a semiconductor material or a composition, is used and a configuration in which the emission wavelength or an emission spectrum is changed to a desired wavelength by the combination of the semiconductor luminescence element and the phosphor.

For example, PTL 1 and PTL 2 propose a light source in which LEDs or semiconductor lasers emitting blue light, green light, and red light are combined. The light source of PTL 1 and PTL 2 is particularly useful for display use because the light beams of three primary colors can individually be emitted any time unlike conventional high-luminance discharge lamp. However, because the LED has a large spread angle of the output light and a large area of a light emitting unit, light utilization efficiency is low in an optical system constituting the light source, and a light output intensity of the light source cannot be increased. Although the semiconductor laser has a small spread angle of the output light and a small area of the light emitting unit, the output light has higher coherence. Therefore, in the case where the light source configured by the semiconductor laser is used in the display, there is a problem in that image quality is degraded due to a speckle noise in a green region and a red region.

In order to solve the above problems, there is proposed a method in which the speckle noise is suppressed while the light utilization efficiency is increased by a combination of semiconductor laser, a light emitting diode, and a phosphor or a combination of the semiconductor laser and the phosphor.

For example, PTL 3 proposes a light source in which a semiconductor laser (blue laser) that radiates blue light, a $Y_3(Al,Ga)_5O_{12}$ phosphor (green phosphor), and a red light emitting diode are combined. PTL 4 proposes a light source in which the blue laser, the $Y_3(Al,Ga)_5O_{12}$ phosphor (green phosphor), and a (Sr,Ca,Al,Si,N) phosphor (red phosphor) are combined. Further, PTL 5 proposes a configuration of a light source in which all the three primary colors are constituted by fluorescent light beams by combining a semiconductor luminescence element radiating ultraviolet light and a disc in which red, green, and blue phosphor layers are provided in parallel.

The conventional light emitting apparatus of PTL 5 will be described below with reference to FIG. 22.

As illustrated in FIG. 22, the conventional light emitting apparatus includes light emitting diode 1003 that emits ultraviolet light and color wheel 1004 in which phosphor layers including red, green, and blue phosphors are disposed in each compartmented region. The light radiated from light emitting diode 1003 is sequentially converted into red light, green light, and blue light by the rotation of the color wheel, and the color wheel is driven such that white light is radiated in the case where the light is observed on temporally average. According to the configuration of FIG. 22, $(Sr,Ca,Ba,Mg)_{10}(PO_4)_6C_{12}$:Eu or $(Ba,Mg)Al_{10}O_{17}$:Eu is used as the blue phosphor, ZnS:Cu, Al, or $(Ba,Mg)Al_{10}O_{17}$:(Eu,Mn) is used as the green phosphor, and $Y_2O_2S$:Eu is used as the red phosphor.

In FIG. 22, 1005 designates an auxiliary optical element, 1006 designates a relay lens, 1007 designates a reflecting mirror, 1008 designates a prism, 1009 designates a spatial optical modulator, and 1010 designates a projector lens.

CITATION LIST

Patent Literatures

PTL 1: Unexamined Japanese Patent Publication No. 2009-252651

PTL 2: Unexamined Japanese Patent Publication No. 11-064789

PTL 3: Unexamined Japanese Patent Publication No. 2012-8409

PTL 4: Unexamined Japanese Patent Publication No. 2012-068465

PTL 5: Unexamined Japanese Patent Publication No. 2004-341105

SUMMARY OF THE INVENTION

However, the following problems are cited in the conventional configuration. In the configuration in which the blue laser, the green phosphor, and the red LED are combined, a plurality of kinds of semiconductor luminescence elements are used, and the semiconductor luminescence elements differ from one another in an electro-optic conversion characteristic and a temperature characteristic, which results in a problem in that complicated control is required for color adjustment of synthesis light. On the other hand, one kind of the semiconductor luminescence element can be used in (i) the method including the blue laser and the rotation wheel in which a transmission region is provided in addition to the green phosphor and the red phosphor (PTL 4 and the like) and (ii) the method including the ultraviolet light source and the rotation wheel in which the blue phosphor, the green phosphor, and the red phosphor are formed in each region (PTL 5). In the methods (i) and (ii), different kinds of phosphors are applied on the identical wheel. However, in the (Sr,Ca,Al,Si,N) phosphor of PTL 4, the red phosphor in which a bivalent Eu ion is used as an activator has the following problems. That is, a spectral half-value width is wide, red color purity is poor, and conversion efficiency degrades rapidly when excitation light density increases. In the red phosphor ($Y_2O_2S$:Eu) of PTL 5 in which a trivalent Eu ion is used as the activator, the spectral half-value width is narrow. However, the red phosphor of PTL 5 has a phosphor lifetime in the order of milliseconds as long as rotation time (for example, 16.7 milliseconds per lap at 60 Hz) of the rotation wheel, which results in a problem in that light taking-in efficiency degrades due to an optical axis deviation of fluorescent light, or color mixture is generated during color switching.

An object of the present invention is to provide a light source and an image projection apparatus, in which the red light having the higher color purity is efficiently emitted while the number of kinds of the luminescence elements is decreased.

To achieve the above object, a light source according to the present invention includes: one or more semiconductor luminescence elements; a first wavelength converting unit that is disposed away from the semiconductor luminescence element; and a rotatable second wavelength converting unit that is disposed between the semiconductor luminescence element and the first wavelength converting unit. The second wavelength converting unit includes: a second wavelength converting region that absorbs output light emitted from the semiconductor luminescence element and radiates second light having a dominant wavelength different from that of the output light, and a transmission region that transmits the output light. The first wavelength converting unit absorbs the output light to radiate first light having a wavelength longer than the dominant wavelength of the second light, and the first light is transmitted through the transmission region.

In the above configuration, density of the light, which is emitted from the semiconductor luminescence element and applied to the first wavelength converting unit, can be decreased lower than density of the light applied to the second wavelength converting unit. Therefore, the conversion efficiency degradation caused by light saturation can be suppressed to efficiently emit long-wavelength light.

The first wavelength converting unit may include a first phosphor, and the second wavelength converting unit may include a second phosphor different from the first phosphor.

In the above configuration, because the light having the wavelength different from the emission wavelength of the output light emitted from the semiconductor luminescence element can be radiated, the light source that radiates the light beams having a plurality of wavelengths different from each other can be made without increasing the number of kinds of the luminescence elements.

An emission peak wavelength of the second phosphor may be located between 500 nm and 600 nm.

In the above configuration, the light source that efficiently radiates the light having the emission wavelength in a green region and the light having the emission wavelength longer than the wavelength in the green region can be made.

An emission peak wavelength of the first phosphor may be located between 580 nm and 670 nm.

In the above configuration, the light source that efficiently radiates the light having the emission wavelength in a red region can be made.

A third wavelength converting region may be formed in the second wavelength converting unit, the third wavelength converting region absorbing the output light to radiate third light having a dominant wavelength different from that of the second light.

The third wavelength converting region and the second wavelength converting region may be formed in an identical surface of the second wavelength converting unit.

The third wavelength converting region may include a third phosphor different from the first phosphor and the second phosphor.

An emission peak wavelength of the third light may be located between 430 nm and 500 nm.

An emission peak wavelength of the output light may be located between 360 nm and 430 nm.

In the above configuration, the light having the emission wavelength different from the wavelengths of the light of the first wavelength converting unit and the light of the second wavelength converting unit can be radiated, and at least the light beams of three colors can efficiently be radiated from the light source. Therefore, the image projection apparatus having good color reproducibility can be made. Additionally, the light source that efficiently emits the blue light, the green light, and the red light can be made by setting the third light to the blue region.

A light polarization converting region may be formed in the second wavelength converting unit, the light polarization converting region being irradiated with the output light of the semiconductor luminescence element, the output light being reflected as third light having a polarization direction different from that of the output light.

An emission peak wavelength of the output light may be located between 430 nm and 500 nm.

Therefore, the output light from the semiconductor luminescence element can be radiated as the output light of the light source. The emission wavelength of the output light from the semiconductor luminescence element is set to the blue region, which allows the output light from the semiconductor luminescence element to be radiated as the blue light.

The light source may further include a dichroic mirror that is provided between the semiconductor luminescence element and a first converging lens. The dichroic mirror may transmit the output light, and reflect the first light, the second light, and the third light.

In the above configuration, the first light, the second light, and the third light can efficiently be radiated from the light source.

The first phosphor may have a phosphor lifetime longer than or equal to the second phosphor.

In the above configuration, the light source that has a long phosphor lifetime and that radiates the light having the higher color purity can be made even if the phosphor having the longer emission wavelength is used.

The second wavelength converting unit may rotate at rotation speeds of 2.7 milliseconds per lap to 20 milliseconds per lap.

An activator of the first phosphor may include at least one of $Eu^{3+}$, $Mn^{2+}$, $Mn^{4+}$, and $Sm^{3+}$.

In the above configuration, the light source having the higher color reproducibility can be made even if the phosphor having the narrow half-value width of the emission spectrum and contains the activator having the long phosphor lifetime, is used.

A first lens may be disposed between the semiconductor luminescence element and the second wavelength converting unit, a second lens may be disposed between the semiconductor luminescence element and the first wavelength converting unit, and the output light may be converged on the second wavelength converting unit through the first lens.

In the above configuration, the light generated on the second wavelength converting unit can efficiently be radiated from the light source.

An irradiation area in which the second wavelength converting unit is irradiated with the output light may be smaller than an area in which the first wavelength converting unit is irradiated with the output light.

A plurality of lens arrays may be disposed between the first wavelength converting unit and the second lens, and the output light may be converged into a plurality of irradiation parts of the first wavelength converting unit.

The first wavelength converting unit may include a plurality of phosphor components containing the first phosphor, and the plurality of phosphor components may be disposed in the plurality of irradiation parts.

In the above configuration, the excitation light density can be decreased by enlarging the irradiation area in the first wavelength converting unit. Therefore, the light saturation can be decreased in the first wavelength converting unit to efficiently radiate the long-wavelength light.

The light source may further include a wavelength cut filter that is provided between the first wavelength converting unit and the second lens. The wavelength cut filter partially or totally reflects the light having wavelengths of 500 nm to 590 nm.

An emission peak wavelength of the first phosphor may be located between 590 nm and 630 nm.

In the above configuration, the red light having the higher color purity can efficiently be radiated.

An image projection apparatus according to the present invention includes: the light source described above; and an image display element. In the above configuration, the red light having the higher color purity can efficiently be radiated.

In the image projection apparatus according to the present invention, the image display element may temporally continuously be irradiated with at least the first light, the second light, and the third light.

In the above configuration, the image projection apparatus that displays the high-color-reproducibility image can be made.

In the configuration of the present invention, in the light source and the image projection apparatus, in which the semiconductor luminescence element and the phosphor are used, the red light having the higher color purity can efficiently be emitted while the number of kinds of the luminescence elements is decreased.

BRIEF DESCRIPTION OF DRAWINGS

FIG. 4 is a timing chart illustrating light intensities of excitation light radiated from a semiconductor luminescence element according to the first exemplary embodiment of the present invention and wavelength converting light radiated from each of the first, second, and third wavelength converting units.

FIG. 5B is a view illustrating chromaticity coordinates of blue light, green light, and red light, which are emitted from a projection lens in the first exemplary embodiment of the present invention.

FIG. 14C is a view illustrating a wavelength cut filter energy transmittance and peak wavelength dependence on luminance conversion efficiency of the light source according to the second exemplary embodiment of the present invention.

DESCRIPTION OF EMBODIMENTS

A light source and an image projection apparatus according to an exemplary embodiment of the present invention will be described below. Each of the following exemplary embodiments illustrates a preferred specific example of the present invention. A numerical value, a shape, a material, a constituent, an arrangement and a connection mode of constituents are indicated in the following exemplary embodiments only by way of example, and does not restrict the present invention. In the constituents of the following exemplary embodiments, the constituent that is not described in an independent claim indicating the highest concept of the present invention is described as an arbitrary constituent.

Each figure is a schematic view, but not strictly illustrated. In the figures, the identical constituent is designated by the identical reference mark.

First Exemplary Embodiment

Configurations and effects of a light source and an image projection apparatus according to a first exemplary embodiment of the present invention and modifications thereof will be described below with reference to FIGS. 1A to 11.

Figure 1A:
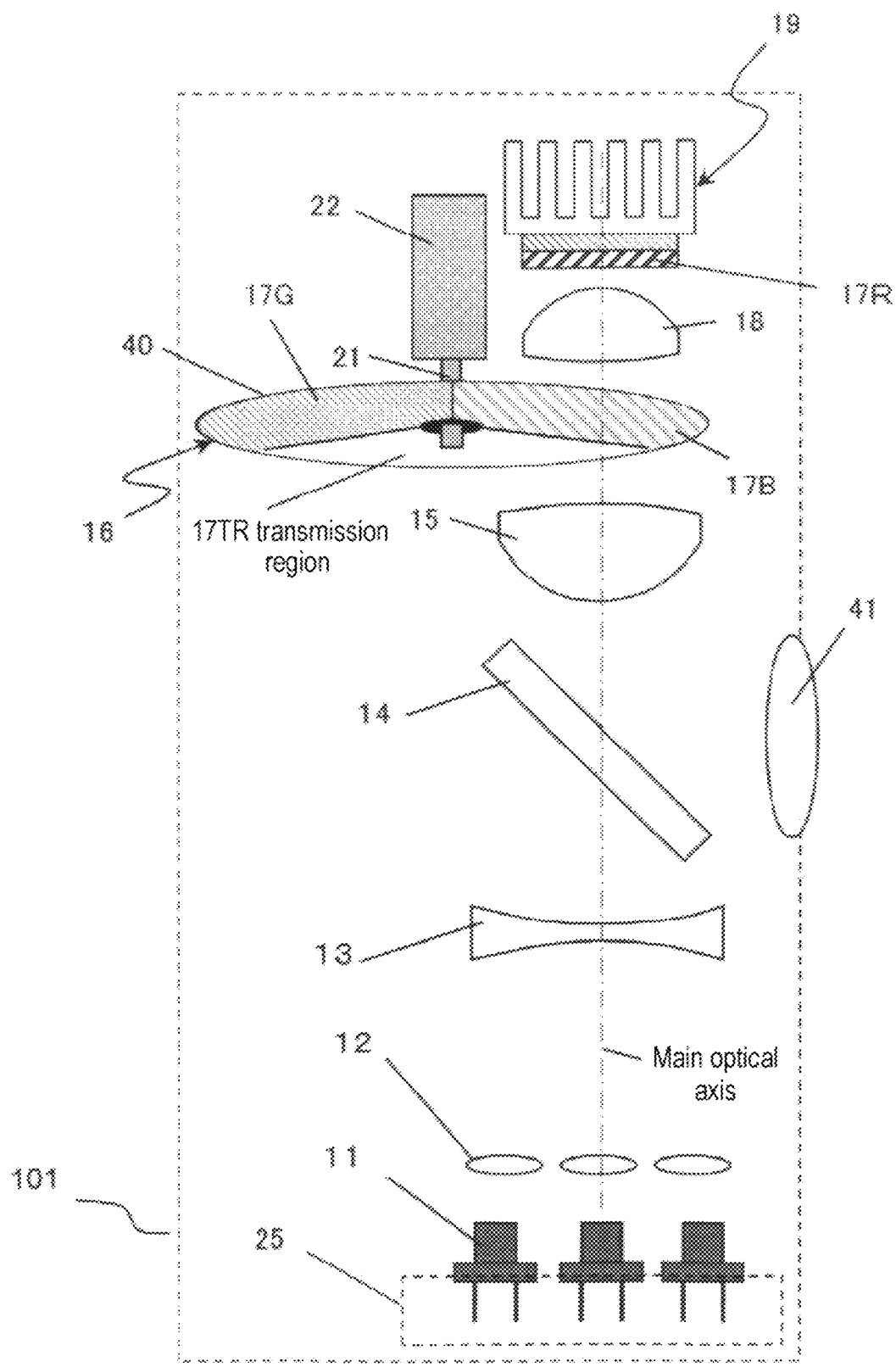
FIG. 1A is a view illustrating a configuration of a light source according to a first exemplary embodiment of the present invention.
Figure 1B:
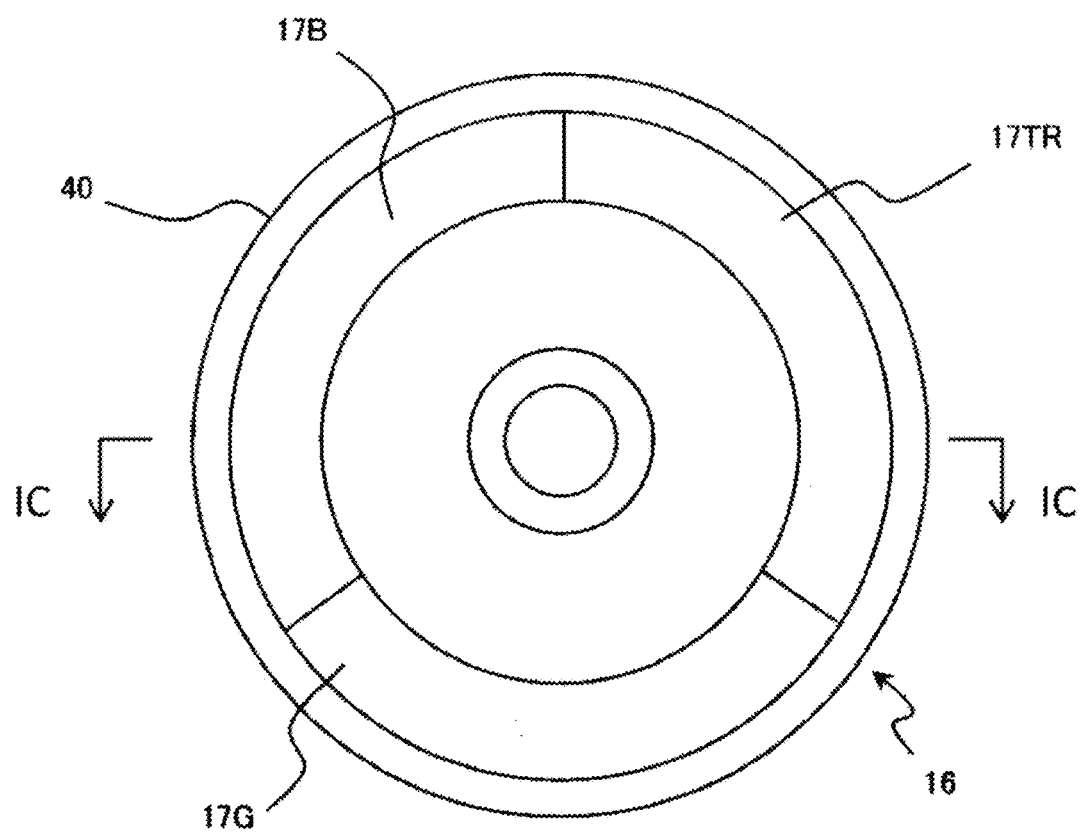
FIG. 1B is a view illustrating a configuration of a second wavelength converting unit according to the first exemplary embodiment of the present invention.
Figure 1C:
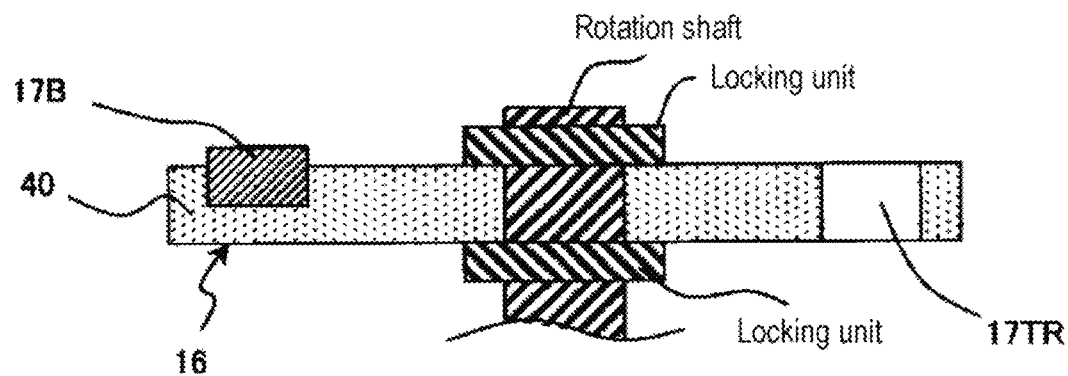
FIG. 1C is a sectional view taken along line IC-IC of FIG. 1B in the second wavelength converting unit according to the first exemplary embodiment of the present invention.
Figure 1D:
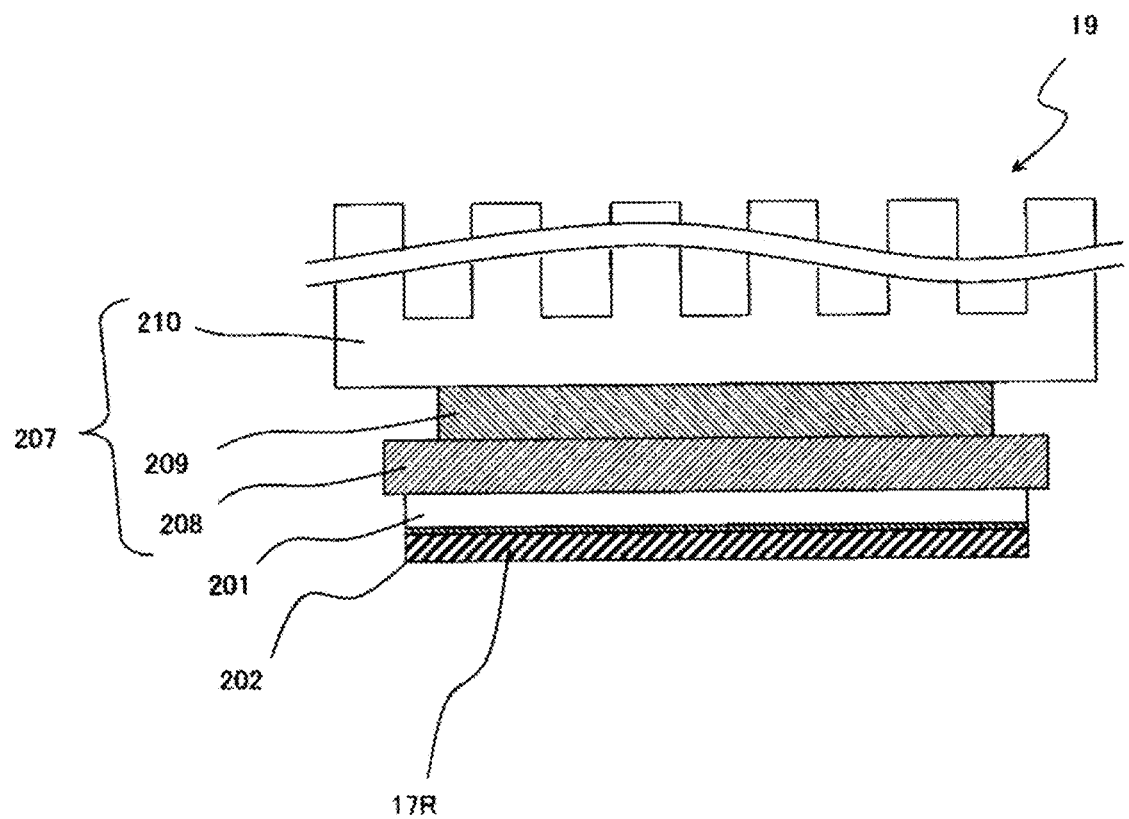
FIG. 1D is a sectional view illustrating a configuration of a first wavelength converting unit according to the first exemplary embodiment of the present invention.
Figure 2:
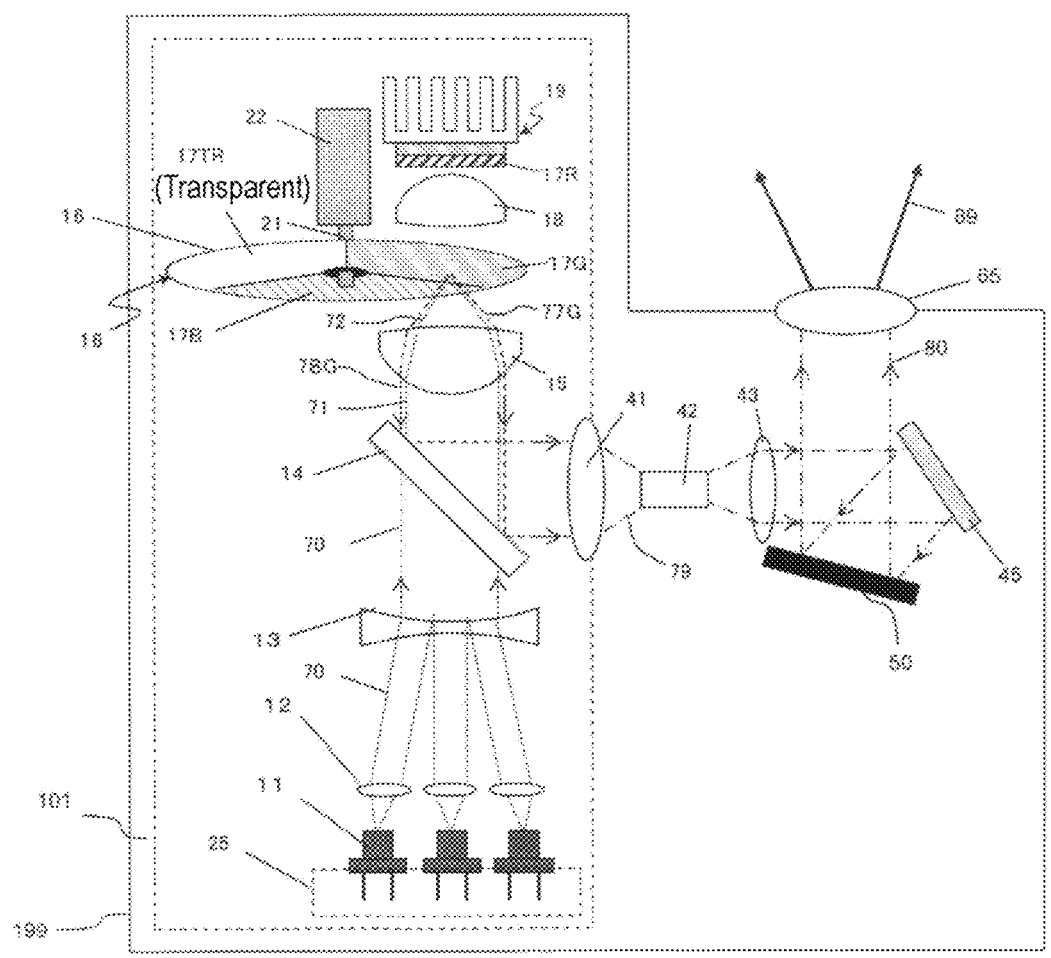
FIG. 2 is a view illustrating the light source according to the first exemplary embodiment of the present invention, a configuration of an image projection apparatus in which the light source is used, and operation to radiate blue light and green light.
Figure 3:
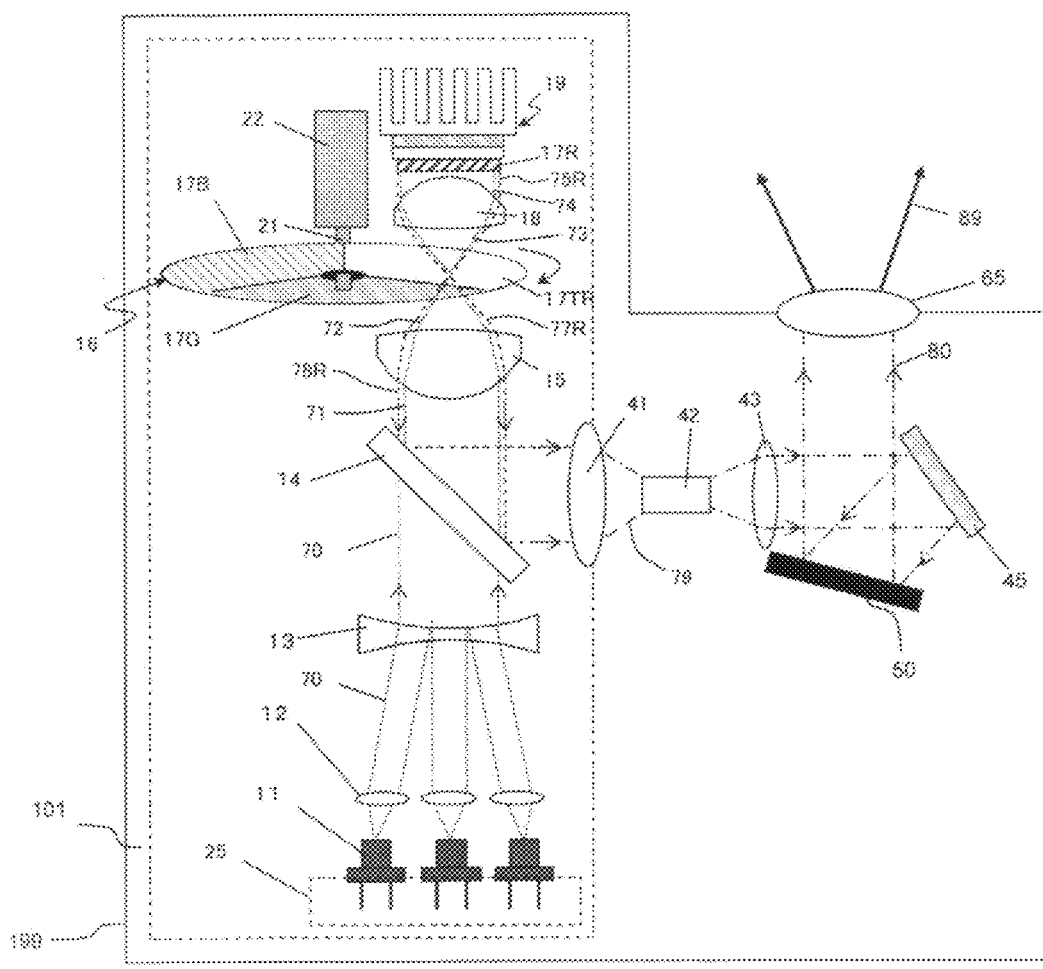
FIG. 3 is a view illustrating the light source according to the first exemplary embodiment of the present invention, a configuration of an image projection apparatus in which the light source is used, and operation to radiate red light.

FIG. 1A is a view illustrating the configuration of the light source according to the first exemplary embodiment of the present invention. FIG. 1B is a view illustrating second wavelength converting unit 16 used in light source 101 according to the first exemplary embodiment when second wavelength converting unit 16 is viewed from a side of semiconductor luminescence element 11. FIG. 1C is a sectional view taken along line IC-IC of FIG. 1B in second wavelength converting unit 16. FIG. 1D is a view illustrating a configuration of first wavelength converting unit 19. FIGS. 2 and 3 are views illustrating a configuration and an operation of the image projection apparatus of the first exemplary embodiment. FIGS. 4 to 6 are views illustrating an effect of the light source of the first exemplary embodiment.

In FIGS. 1A to 6, a common constituent of the first exemplary embodiment is designated by an identical numeral, and the overlapping description is omitted.

(Configuration)

As illustrated in FIG. 1A, light source 101 according to the first exemplary embodiment is mainly configured by semiconductor luminescence element 11 that is a nitride semiconductor laser radiating near-ultraviolet light, first wavelength converting unit 19 that converts the near-ultraviolet light radiated from semiconductor luminescence element 11 into red light, and second wavelength converting unit 16 that converts the near-ultraviolet light into blue light and green light.

Second wavelength converting unit 16 has a configuration in which a phosphor or a transmission region is provided in each region of a disc-shaped base as illustrated in FIG. 1B, and second wavelength converting unit 16 rotates at a predetermined rotation speed during operation. As to a specific configuration of second wavelength converting unit 16, second fluorescence emission component 17G, third fluorescence emission component 17B, and light transmission region 17TR are formed in each region in the vicinity of a predetermined outer periphery of substrate 40 that is a disc-shaped aluminum alloy plate. For example, second fluorescence emission component 17G is a phosphor film that is formed into an arc shape with a thickness of 100 μm to 500 μm and a width of 5 mm. For example, the phosphor film is made by mixing a green phosphor having a principal component of Ce-activated $Y_3(Al,Ga)_5O_{12}$ in an organic transparent material such as dimethyl silicone or a binder that is an inorganic transparent material such as low-melting-point glass. Similarly, for example, third fluorescence emission component 17B is made by mixing a blue phosphor having a principal component of Eu-activated $Sr_3MgSi_2O_8$ in the organic or inorganic transparent material.

For example, as illustrated in FIG. 1C, light transmission region 17TR is formed by making an opening in substrate 40. For example, as illustrated in FIG. 1A, second wavelength converting unit 16 is connected to rotation shaft 21 of rotation mechanism 22 that is a motor so as to rotate at a predetermined rotation speed.

On the other hand, first wavelength converting unit 19 including first fluorescence emission component 17R is disposed at a position different from second wavelength converting unit 16. The configuration of first wavelength converting unit 19 will be described below with reference to FIG. 1D. In first wavelength converting unit 19, reflecting film 202 such as Ag is formed on substrate 201 such as Cu so as to reflect the light of the phosphor, and first fluorescence emission component 17R having a film thickness of 100 µm to 1000 µm is formed on reflecting film 202. For example, first fluorescence emission component 17R is made by mixing a red phosphor having a principal component of Eu- and Sm-activated $LaW_3O_{12}$ in a binder such as low-melting-point glass. Heat radiation component 207 is attached to a side opposite to substrate 201. Heat radiation component 207 is configured by heat radiation substrate 208 such as a copper plate, heat radiation mechanism 209 such as a Peltier element, and heat radiation fin 210. At this point, a constant current is applied to heat radiation mechanism 209 such that first fluorescence emission component 17R is set to a given temperature, for example, 100° C. or less.

More particularly, light source 101 including first wavelength converting unit 19 and second wavelength converting unit 16 is configured as follows (see FIG. 1A).

In light source 101, for example, 25 semiconductor luminescence elements 11 are disposed on heat sink 25 (for convenience, only three semiconductor luminescence elements 11 are illustrated in FIGS. 1A to 3 to avoid complication). For example, semiconductor luminescence elements 11 is a semiconductor laser having a light output of 2 watts and a center wavelength of the emission wavelength in a range of 360 nm to 430 nm, more specifically, a semiconductor laser having the center wavelength of 395 nm. Collimator lens 12 is disposed in front of semiconductor luminescence element 11 such that the output light emitted from semiconductor luminescence element 11 is collected into concave lens 13. Dichroic mirror 14 is provided between semiconductor luminescence element 11 and second wavelength converting unit 16. For example, dichroic mirror 14 is set so as to transmit light having wavelengths of 360 nm to 430 nm and to reflect light having wavelengths of 430 nm to 670 nm. Dichroic mirror 14, first converging lens 15, second wavelength converting unit 16, second converging lens 18, and first wavelength converting unit 19 are sequentially arranged on a main optical axis of light source 101. At this point, second fluorescence emission component 17G, third fluorescence emission component 17B, and light transmission region 17TR, which are formed in second wavelength converting unit 16, are placed so as to be disposed on the main optical axis by the rotation of second wavelength converting unit 16.

On the other hand, first wavelength converting unit 19 is fixed on the main optical axis at the back of second wavelength converting unit 16 (the position opposite to the semiconductor luminescence element) through second converging lens 18. An outer diameter of rotation mechanism 22 is sufficiently smaller than that of second wavelength converting unit 16 such that second converging lens 18 and first wavelength converting unit 19 can easily be disposed on the main optical axis.

(Operation)

Operation of light source 101 of the first exemplary embodiment will be described below using image projection apparatus 199 provided with light source 101 in FIGS. 2 and 3. In the configuration of image projection apparatus 199 of the first exemplary embodiment, image display element 50 and projection lens 65 are mainly disposed in an emission portion of light source 101 to be able to project an image.

Light source 101 of the first exemplary embodiment radiates wavelength converting light 79. So-called red light having the main emission wavelengths of 580 nm to 670 nm, so-called green light having the main emission wavelengths of 500 nm to 600 nm, and so-called blue light having the main emission wavelengths of 430 nm to 500 nm are temporally continued in wavelength converting light 79. That is, wavelength converting light 79 is white light, which is formed by periodically radiating the red light, the green light, and the blue light that are the light beams of three primary colors in the order of from red, green, blue, to red. For example, wavelength converting light 79 has a period of about 8.3 milliseconds (120 Hz).

The operation of light source 101 will be described below. For example, beams of output light 70 having the center wavelength of 395 nm and a total light quantity of 50 watts are emitted from the plurality of semiconductor luminescence elements 11, transmitted through dichroic mirror 14 while forming one light flux through collimator lens 12 and concave lens 13, and converged into one of fluorescence emission components 17B and 17G and light transmission region 17TR of second wavelength converting unit 16 by converging lens 15.

At this point, second wavelength converting unit 16 is rotated at a predetermined rotation speed by rotation mechanism 22 and rotation shaft 21. The rotation of second wavelength converting unit 16 prevents specific positions of fluorescence emission component 17B and 17G from being continuously irradiated with output light 70, and temporally changes an emission spectrum of wavelength converting diffused light 76 converted by second wavelength converting unit 16.

The case where second fluorescence emission component 17G of second wavelength converting unit 16 is disposed on the main optical axis will be described with reference to FIG. 2. Excitation light 71 passing through dichroic mirror 14 is converged into second fluorescence emission component 17G of second wavelength converting unit 16 with an area of 1 $mm^2$ or less by first converging lens 15. In the converged excitation light, the light having the center wavelength of 395 nm is converted into wavelength converting light 77G having the main emission wavelengths of 500 nm to 600 nm by the green phosphor included in second fluorescence emission component 17G, and radiated onto the side of converging lens 15. At this point, although wavelength converting light 72 is so-called Lambertian light having a radiation angle in all directions, an emission region of wavelength converting light 72 is a point light source of 1 $mm^2$ or less. Therefore, wavelength converting light 72 becomes wavelength converting light 78G that is substantially parallel light through first converging lens 15, and wavelength converting light 78G moves on to dichroic mirror 14. Wavelength converting light 78G is reflected by dichroic mirror 14, and emitted from light source 101 as wavelength converting light 79 through converging lens 41.

The similar operation is performed in the case where second wavelength converting unit 16 rotates to dispose third fluorescence emission component 17B on the main optical axis, and the wavelength converting light having the main emission wavelengths of 430 nm to 500 nm is emitted as wavelength converting light 79.

Wavelength converting light 79 emitted from first converging lens 41 of light source 101 by the above operation is converged into and incident on an end portion of rod lens 42. In wavelength converting light 79 multiply reflected in rod lens 42, a wavefront light intensity distribution is converted into a rectangular shape and radiated. Then, wavelength converting light 79 becomes straight light through convex lens 43, and is guided to reflectance image display element 50 such as DMD by reflecting mirror 45. The light applied to image display element 50 becomes signal light 80 in which a two-dimensional video signal is superimposed on the light, and reflected by image display element 50. Then, signal light 80 becomes video light 89 that can be projected to a predetermined screen (not illustrated) through projection lens 65, and emitted from projection apparatus 199.

The operation of first wavelength converting unit 19 in the case where transmission region 17TR of second wavelength converting unit 16 is disposed on the main optical axis will be described below with reference to FIG. 3. In the case where second wavelength converting unit 16 rotates to dispose transmission region 17TR on the main optical axis, excitation light 71 passes through transmission region 17TR. After excitation light 72 transmitted through transmission region 17TR is temporarily converged at a focal position, excitation light 72 becomes excitation light 73 that is spread light, is incident on second converging lens 18 to become excitation light 74 that is substantially parallel light, and is incident on first wavelength converting unit 19.

As described above, for example, the red phosphor having the principal component of Eu- and Sm-activated $LaW_3O_{12}$ is disposed as the phosphor of first fluorescence emission component 17R of first wavelength converting unit 19. The red phosphor converts the excitation light having the center wavelengths of 360 nm to 430 nm into wavelength converting light 75R that is the red light having the main emission wavelengths of 580 nm to 670 nm. At this point, in first fluorescence emission component 17R, for example, excitation light has the irradiation area of 1 $cm^2$, and an excitation light irradiation density is set as low as about 1/100 of excitation light irradiation densities in second fluorescence emission component 17G and third fluorescence emission component 17B of second wavelength converting unit 16.

Heat generated from first fluorescence emission component 17R is efficiently exhausted by heat radiation component 207. That is, the heat generated from first fluorescence emission component 17R is transmitted from substrate 201 to heat radiation substrate 208, heat radiation mechanism 209 that is the Peltier element, and heat radiation fin 210, and radiated to an outside.

Like the description in FIG. 2, the light is emitted from projection apparatus 199 as video light 89 capable of being projected to the predetermined screen (not illustrated).

(Effect)

Functions and effects of the light source and the image projection apparatus of the first exemplary embodiment will be described below.

FIG. 4 is an example of a timing chart illustrating light intensities of the excitation light and the wavelength converting light. A part (a) of FIG. 4 illustrates time dependence of the light intensity of excitation light 71 that is emitted from semiconductor luminescence element 11 to move on to second wavelength converting unit 16. Parts (b) and (c) illustrate time dependence of the light intensities of wavelength converting light 77G and wavelength converting light 77B that are emitted from second fluorescence emission component 17G and third fluorescence emission component 17B. Parts (d) and (e) illustrate time dependence of the light intensity of wavelength converting light 75R radiated from first fluorescence emission component 17R and time dependence of the light intensity of wavelength converting light 77R passing through transmission region 17TR.

As illustrated in the part (a), excitation light 71 is radiated with a constant light output. Then, as illustrated in the part (b), wavelength converting light 77G (green light) is radiated only between 0 msec and $t_a$ msec. That is, second fluorescence emission component 17 is disposed on the main optical axis between 0 msec and $t_a$ msec. Then, as illustrated in the part (c), wavelength converting light (blue light) is radiated between $t_a$ msec and $t_b$ msec.

The effect of second wavelength converting unit 16 will be described with reference to parts (d) and (e). In the excitation light passing through transmission region 17TR of second wavelength converting unit 16, wavelength converting light 77R (red light) is radiated between $t_b$ msec and T msec in first fluorescence emission component 17R. At this point, in the first exemplary embodiment, a phosphor, which utilizes a transition of trivalent europium such as Eu- and Sm-activated $LaW_3O_{12}$, is used as the red phosphor contained in first fluorescence emission component 17R, and the phosphor has the narrow spectral half-value width of 10 nm or less and the higher color purity. On the other hand, because the phosphor has a phosphor lifetime (time for which the fluorescent intensity becomes 10%) of several hundreds of microseconds to several tens of milliseconds, the phosphor continuously radiates the fluorescent light even after T msec when the irradiation of the excitation light is stopped (afterglow). Color mixture is generated because the afterglow overlaps the emission time of next second fluorescence emission component 17G on the timing chart. However, in the configuration of the first exemplary embodiment, wavelength converting light 75R can be interrupted by second wavelength converting unit 16 after T msec. Therefore, unnecessary wavelength converting light 75R can be prevented from mixing with another wavelength converting light (in this case, wavelength converting light 77G) to degrade the color purity of another wavelength converting light.

Figure 5A:
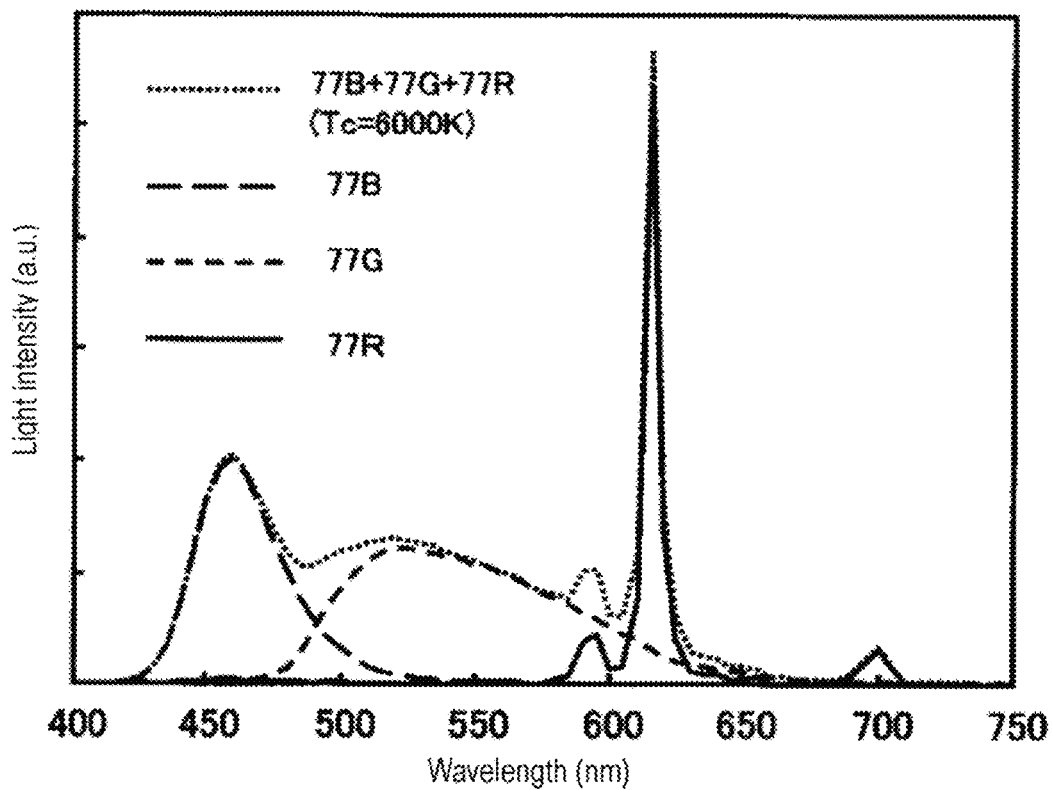
FIG. 5A is a view illustrating a spectrum of the wavelength converting light radiated from the light source according to the first exemplary embodiment of the present invention.
Figure 6:
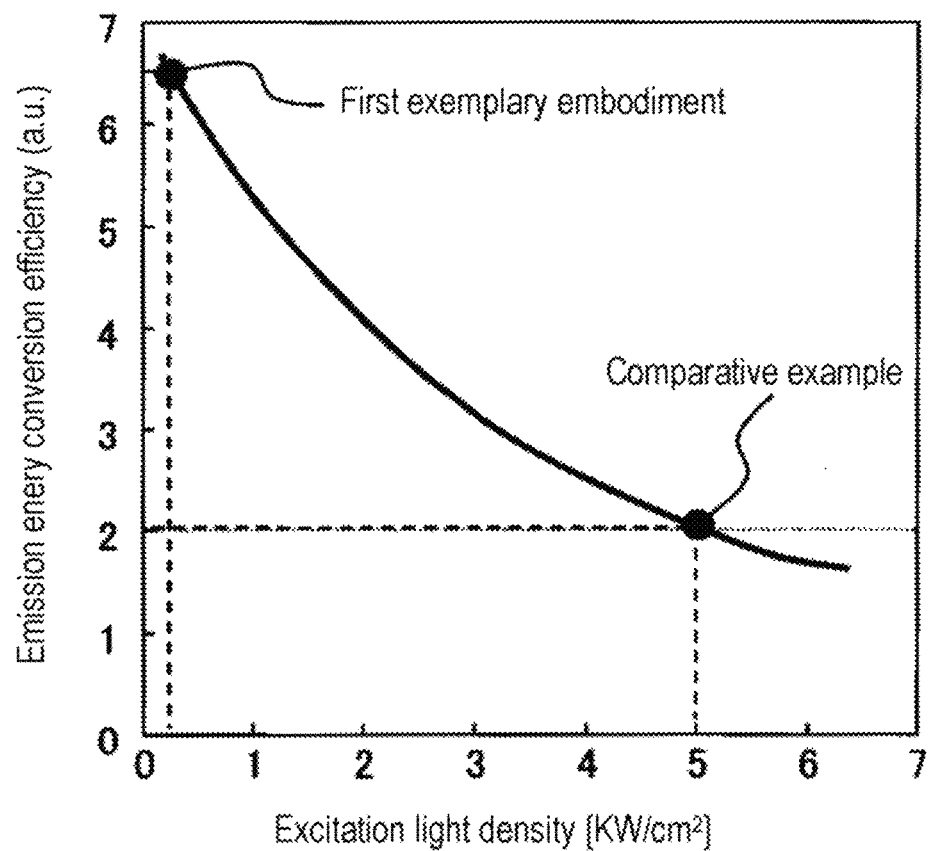
FIG. 6 is a view illustrating an effect of the light source according to the first exemplary embodiment of the present invention.

FIGS. 5A and 5B illustrate an example in which the emission spectrum of light source 101 is designed based on the above effect.

FIG. 5A illustrates a spectrum of wavelength converting light 79 emitted from light source 101. In light source 101, wavelength converting light 77R that is the red light radiated from first fluorescence emission component 17R, wavelength converting light 77G that is the green light radiated from second fluorescence emission component 17G, and wavelength converting light 77B that is the blue light radiated from third fluorescence emission component 17B are emitted at constant time intervals, and the white light having a color temperature of 6000K is radiated as a temporally-averaged spectrum. At this point, preferably Eu- and Sm-activated $LaW_3O_{12}$ is used as the phosphor radiating the red light, Ce-activated $Y_3(Al,Ga)_5O_{12}$ is used as the phosphor radiating the green light, and Eu-activated $Sr_3MgSi_2O_8$ is used as the phosphor radiating the blue light. Thus, the degradation of the taking-in efficiency of the optical system for the wavelength converting light radiated from the phosphor, or the degradation of the color reproducibility of the light radiated from light source 101 due to the color mixture can be suppressed, even when the phosphor in which trivalent europium having the phosphor lifetime of several milliseconds is activated is used as the red phosphor.

FIG. 6 illustrates excitation light density dependence of fluorescent radiation intensity in the Eu- and Sm-activated $LaW_3O_{12}$ phosphor used in first fluorescence emission component 17R. In the first exemplary embodiment, the density of the excitation light applied to first fluorescence emission component 17R can be decreased to about 0.05 $KW/cm^2$ that is about one hundredth of 5 $KW/cm^2$ or more which is applied to second fluorescence emission component 17G or third fluorescence emission component 17B. Therefore, the degradation of the energy conversion efficiency of the red phosphor accompanied with the excitation light density can be suppressed to radiate the red light with high efficiency, and the conversion efficiency can be increased in light source 101.

The above configuration can provide the light source and the projection apparatus, in which the number of kinds of luminescence elements is decreased and the red light has the higher conversion efficiency and color purity.

In the above configuration, there is no limitation to the phosphors described above. For example, a Eu-activated $(Ba,Sr)_3Al_{10}O_{17}$ phosphor typified by Eu-activated $Ba_3Al_{10}O_{17}$ and a Eu-activated $(Sr,Ca,Ba,Mg)_{10}(PO_4)_6C_{12}$ phosphor may be used as the blue phosphor. Ce- or Eu-activated phosphor such as a Eu-activated β type SiAlON phosphor, a Eu-activated $SrSiO_3$ phosphor, a Eu-activated $Sr_3SiO_5$ phosphor, a Eu-activated $SrSi_2O_2N_2$ phosphor, a Eu-activated $Ba_3Si_8O_{12}N_2$ phosphor, and a Ce-activated $CaSc_2O_4$ phosphor can be used as the green phosphor.

The red phosphor is not limited to Eu- and Sm-activated $LaW_3O_{12}$. For example, there may be used a phosphor in which at least one of silicon oxide, tungsten oxide, molybdenum oxide, indium oxide, yttrium oxide, zinc oxide, silicon nitride, silicon oxynitride, aluminum oxynitride, and an organic polymer is included in a matrix constituent element while a lanthanoid ion element or a metallic ion element is contained as the activator in the matrix material. Specifically, the first exemplary embodiment is useful for red phosphors, such as a Eu-activated $La_2O_2S$ phosphor, a Eu-activated $LiW_2O_8$ phosphor, a Eu- and Sm-activated $LiW_2O_8$ phosphor, a Eu- and Mn-activated $(Sr,Ba)_3MgSi_2O_8$ phosphor, a Mn-activated $3.5MgO.0.5MgF_2.GeO_2$ phosphor, a Eu-activated $YVO_4$ phosphor, a Eu-activated $Y_2O_3$ phosphor, and a Eu-activated $Y_2O_2S$ phosphor, in which the half-value width of the fluorescent spectrum is narrow although the phosphor lifetime is long.

The first exemplary embodiment is also useful for a rare earth complex phosphor in which a lanthanoid ion element or a metallic ion element is used as the activator. Specifically, a rare earth complex phosphor having a molecular structure in which two kinds of phosphine oxides are coordinated to trivalent europium is cited as the rare earth complex phosphor.

In the first exemplary embodiment, the semiconductor laser having the center wavelength of 395 nm is cited as an example of the semiconductor luminescence element. However, the present invention is not limited thereto. The center wavelength, such as 400 nm, 405 nm, and 410 nm, may be adjusted in the range of 360 nm to 430 nm according to an absorption spectrum of the phosphor, or plural semiconductor lasers in which the center wavelength varies in the range of 2 nm to 10 nm may be combined to broaden a wavelength spectral width.

In the light source of the first exemplary embodiment, the rotation speed of second wavelength converting unit 16 is set to about 8.3 milliseconds per lap corresponding to 120 Hz. However, the present invention is not limited thereto. For example, the rotation speed can be set between about 20 milliseconds per lap corresponding to 50 Hz (3,000 rpm) and about 2.7 milliseconds per lap corresponding to 360 Hz (21,600 rpm).

First Modification

A first modification of the light source according to the first exemplary embodiment will be described below with reference to FIG. 7. The first modification differs from the first exemplary embodiment in the configuration of first wavelength converting unit 19. Therefore, a different portion between the first modification and the first exemplary embodiment will mainly be described with reference to an enlarged view of the vicinity of first wavelength converting unit 19.

One of the feature points of first wavelength converting unit 19 of the first modification is that on-chip lens 205 is formed on first fluorescence emission component 17R of first wavelength converting unit 19 of the first exemplary embodiment.

Specifically, for example, reflecting film 202 made of Ag is formed on substrate 201 made of copper, first fluorescence emission component 17R in which the red phosphor is mixed in the binder such as low-melting-point glass is formed on reflecting film 202, and on-chip lens 205 configured by a convex lens in which an anti-reflection film is formed on an inorganic glass is formed on first fluorescence emission component 17R.

Figure 7:
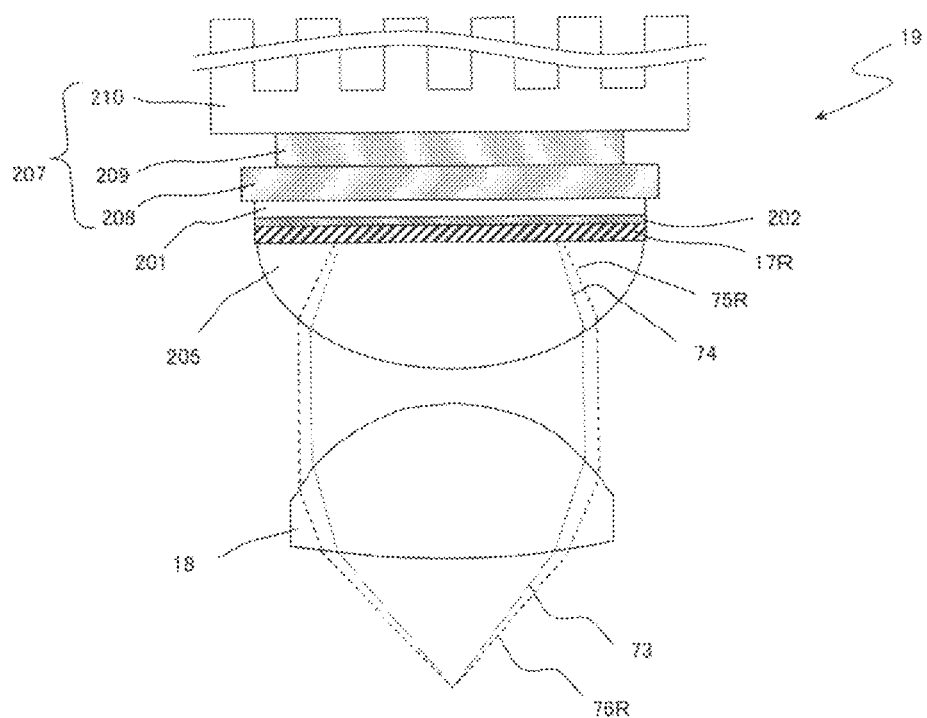
FIG. 7 is a view illustrating a first modification of the light source according to the first exemplary embodiment of the present invention.

In the configuration of FIG. 7, excitation light 73 passing through the light transmission region of the second wavelength converting unit (not illustrated) becomes the parallel light through second converging lens 18, the parallel light becomes excitation light 74 converged with predetermined light density through on-chip lens 205, and excitation light 74 is applied to first fluorescence emission component 17R. Wavelength converting light 75R radiated in all directions from first fluorescence emission component is collimated by on-chip lens 205, and moves on to the light transmission region (not illustrated) through second converging lens 18.

As described above, using the configuration of the first modification, the degradation of the energy conversion efficiency of the red phosphor is suppressed by decreasing the light density of the excitation light applied to first fluorescence emission component 17R, and therefore, light utilization efficiency of the wavelength converting light radiated from first fluorescence emission component 17R can be increased.

The configuration of heat radiation component 207 is similar to that described in FIG. 1D.

Second Modification

A second modification of the light source according to the first exemplary embodiment will be described below with reference to FIG. 8. The second modification differs mainly from the first exemplary embodiment in the configuration of first wavelength converting unit 19. Therefore, a different portion between the second modification and the first exemplary embodiment will mainly be described with reference to an enlarged view of the vicinity of first wavelength converting unit 19.

One of the feature points of first wavelength converting unit 19 of the second modification is that a conical recess is provided on substrate 201 and that a first phosphor component is disposed in the conical recess.

Specifically, for example, the conical recess is formed on substrate 201 made of copper, reflecting film 202 made of Ag is formed on a side surface of the conical recess, and first fluorescence emission component 17R formed by mixing the red phosphor in the binder such as low-melting-point glass is embedded in the conical recess. At this point, a surface of first fluorescence emission component 17R is formed into a concave shape on the side irradiated with excitation light 74.

The configuration of heat radiation component 207 is similar to that described in FIG. 1D.

Figure 8:
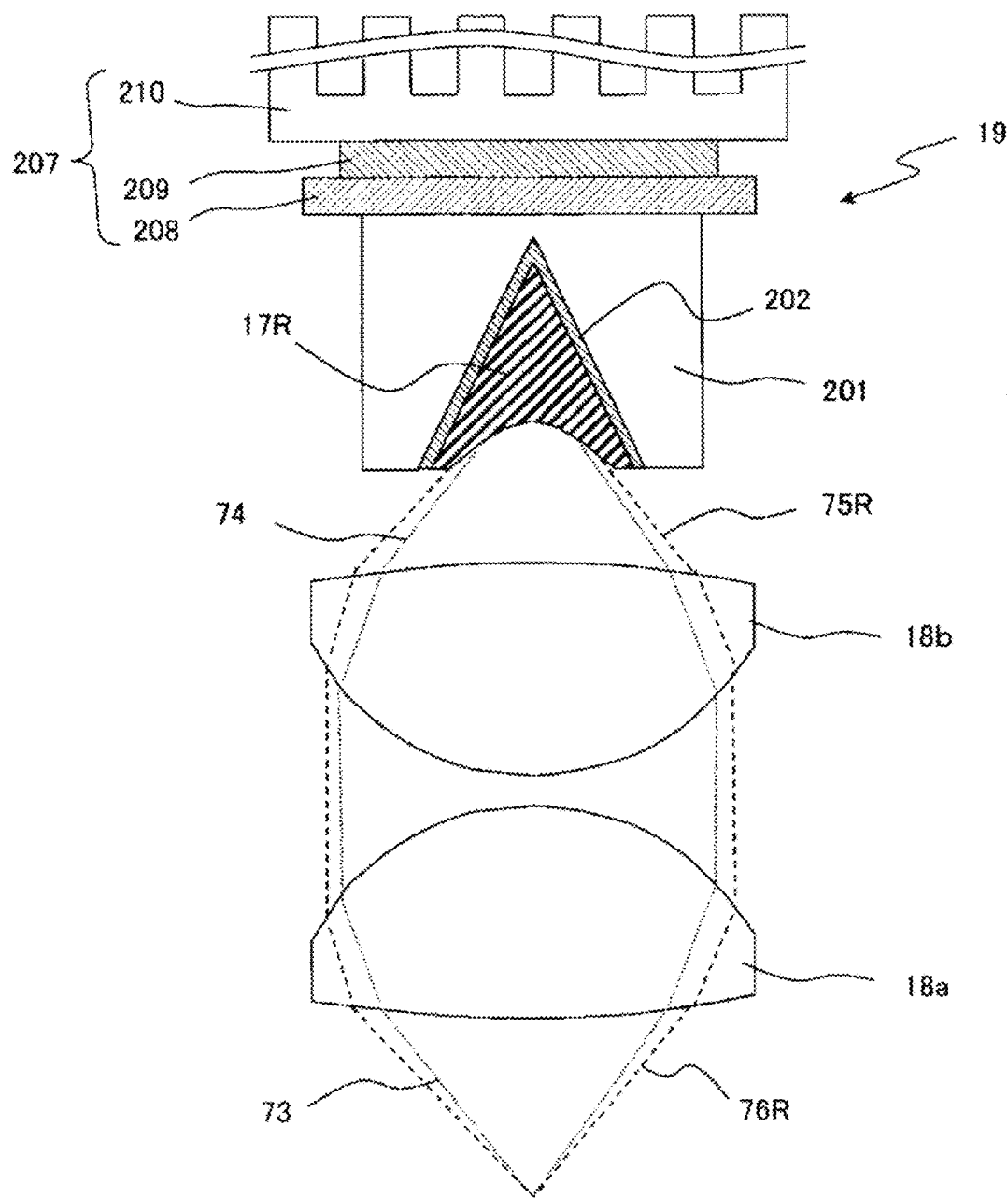
FIG. 8 is a view illustrating a second modification of the light source according to the first exemplary embodiment of the present invention.

In the configuration of FIG. 8, excitation light 73 passing through the light transmission region of the second wavelength converting unit (not illustrated) becomes excitation light 74 converged by second converging lens 18a and third converging lens 18b, and excitation light 74 is applied to first fluorescence emission component 17R. Excitation light 74 applied to first fluorescence emission component 17R becomes wavelength converting light 75R that is the red light, and radiated onto the side of third converging lens 18b. At this point, because the red light generated by first fluorescence emission component 17R becomes wavelength converting light 75R having the directivity by reflecting film 202 formed in the conical recess, the red light is efficiently taken in third converging lens 18b and second converging lens 18a to move on to the light transmission region of the second wavelength converting unit.

As described above, using the configuration of the second modification, the utilization efficiency of the wavelength converting light radiated from first fluorescence emission component 17R can be increased while the light density of the excitation light applied to first fluorescence emission component 17R is decreased.

The conical recess provided in substrate 201 may have a triangular pyramid recess or a rectangular hole.

Third Modification

Figure 9:
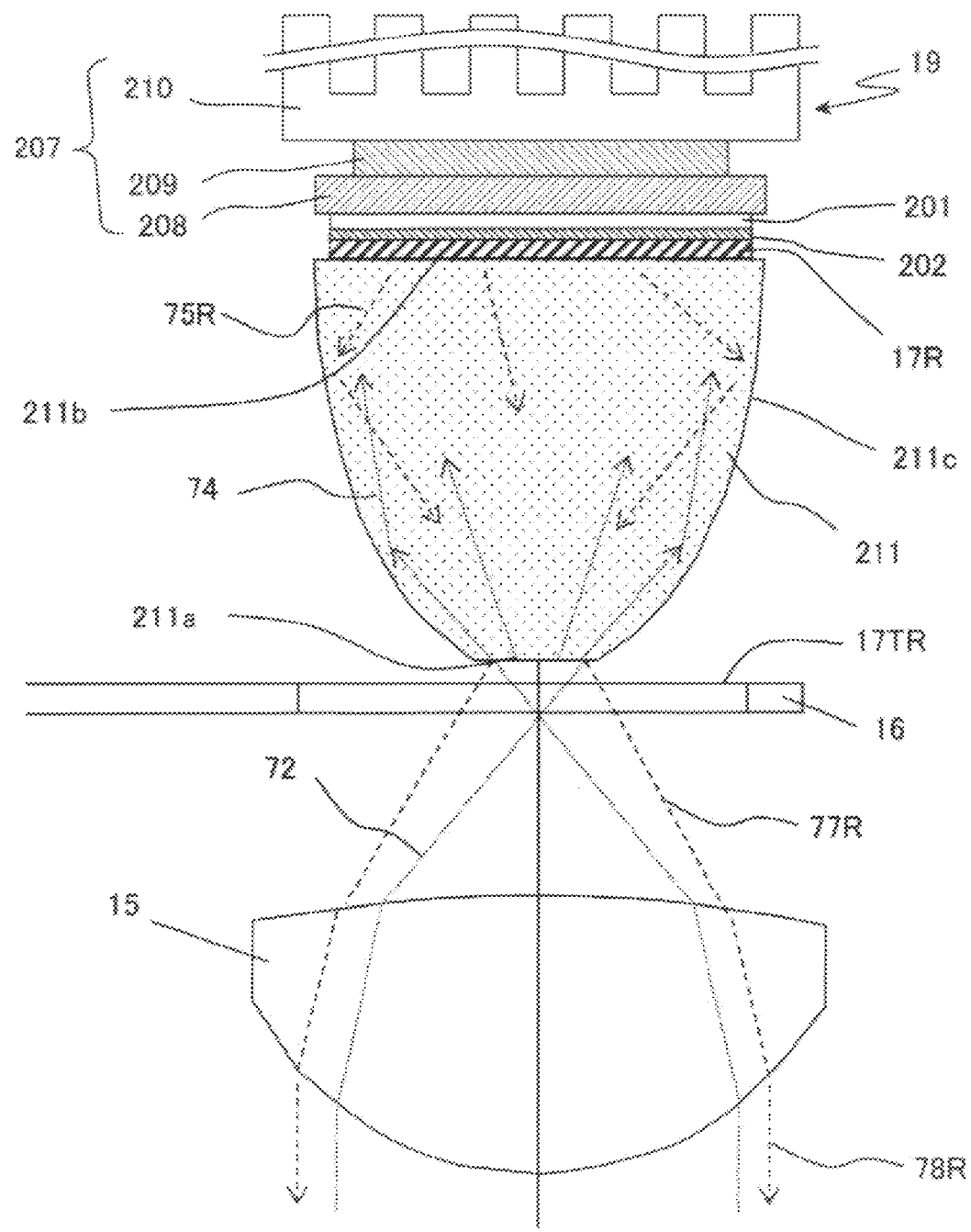
FIG. 9 is a view illustrating a third modification of the light source according to the first exemplary embodiment of the present invention.

A third modification of the light source according to the first exemplary embodiment will be described below with reference to FIG. 9. The third modification differs mainly from the first exemplary embodiment in the configuration of first wavelength converting unit 19. Therefore, a different portion between the third modification and the first exemplary embodiment will mainly be described with reference to an enlarged view of the vicinity of first wavelength converting unit 19.

One of the feature points of first wavelength converting unit 19 of the third modification is that internal reflectance paraboloid lens 211 is formed on first fluorescence emission component 17R of first wavelength converting unit 19 of the first exemplary embodiment.

Specifically, reflecting film 202 is formed on substrate 201, first fluorescence emission component 17R is formed on reflecting film 202, and internal reflectance paraboloid lens 211 is disposed on first fluorescence emission component 17R. Internal reflectance paraboloid lens 211 includes first end face 211a, second end face 211b, and parabolic side surface 211c, and can totally reflect the light from the phosphor by a difference in refractive index between internal reflectance paraboloid lens 211 and an air layer to change an emission area. Excitation light 72 emitted from first converging lens 15 is transmitted through transmission region 17TR of second wavelength converting unit 16 while being converged, and incident from first end face 211a of internal reflectance paraboloid lens 211. Then, excitation light 72 expands a light distribution while propagating in internal reflectance paraboloid lens 211 as excitation light 74, and excitation light 74 is applied to first fluorescence emission component 17R. Wavelength converting light 75R radiated from first fluorescence emission component 17R contracts the light distribution while propagating in internal reflectance paraboloid lens 211. Then, wavelength converting light 75R is radiated from first end face 211a, and transmitted through light transmission region 17TR. Then, wavelength converting light 75R is coupled to the optical system by first converging lens 15, and emitted as the output light of light source 101. At this point, coupling efficiency of internal reflectance paraboloid lens 211 and first converging lens 15 can be increased by bringing first end face 211a and second wavelength converting unit 16 close to each other.

The configuration of heat radiation component 207 is similar to that described in FIG. 1D.

As described above, using the configuration of the second modification, the utilization efficiency of the wavelength converting light radiated from first fluorescence emission component 17R can be increased while the light density of the excitation light applied to first fluorescence emission component 17R is decreased.

Fourth Modification

A fourth modification of the light source of the first exemplary embodiment will be described below with reference to FIG. 10. The fourth modification differs mainly from the first exemplary embodiment in the configuration of first wavelength converting unit 19. Therefore, a different portion between the fourth modification and the first exemplary embodiment will mainly be described with reference to an enlarged view of the vicinity of first wavelength converting unit 19.

One of the feature points of first wavelength converting unit 19 of the fourth modification is that microlens array 205a is formed on first fluorescence emission component 17R of first wavelength converting unit 19 of the first exemplary embodiment.

Specifically, reflecting film 202 is formed on substrate 201, first fluorescence emission component 17R in which the red phosphor is mixed in the binder such as low-melting-point glass is formed on the red phosphor, and microlens array 205a is disposed on first fluorescence emission component 17R.

Figure 10:
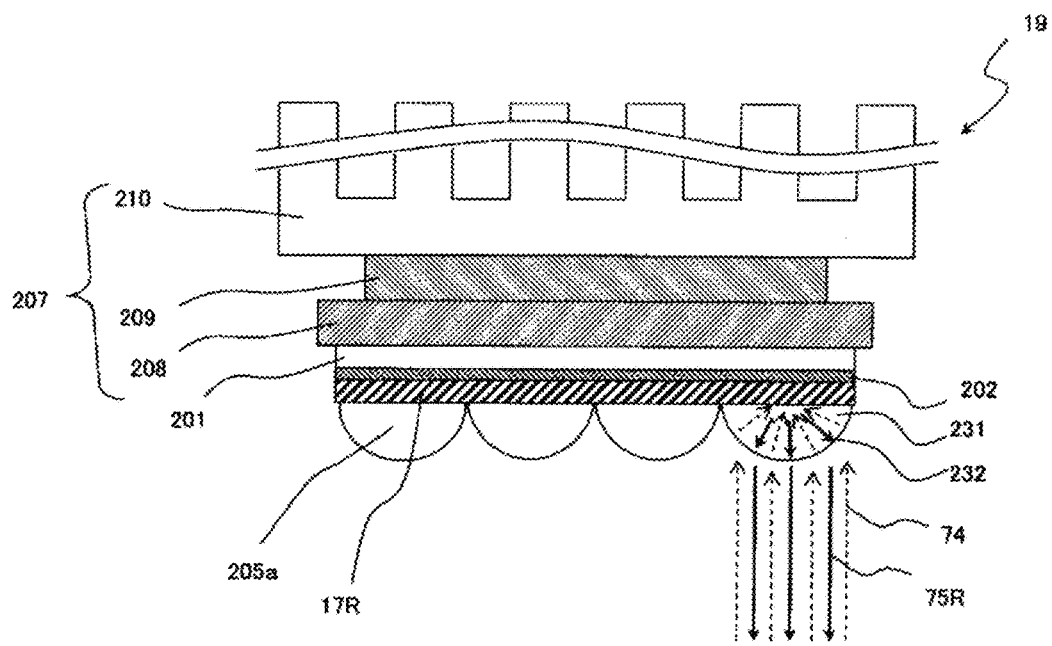
FIG. 10 is a view illustrating a fourth modification of the light source according to the first exemplary embodiment of the present invention.

In the configuration of FIG. 10, excitation light 74 is divided according to the number of microlenses of microlens array 205a, becomes incident light 231 refracted and converged by a lens effect, and a local portion of first fluorescence emission component 17R is irradiated with incident light 231. At this point, for example, assuming that microlens array 205a is a 10-by-10 array, the excitation light converged by one microlens is decreased to one hundredth of the first exemplary embodiment, so that the wavelength conversion can be performed while the conversion efficiency degradation caused by the light saturation of the phosphor is suppressed. Wavelength converting light 232 radiated from first fluorescence emission component 17R is emitted as wavelength converting light 75R while being collimated by the microlens. Therefore, the light can be coupled to the second converging lens while a light diffusion loss is decreased.

The configuration of heat radiation component 207 is similar to that described in FIG. 1D.

As described above, using the configuration of the fourth modification, the degradation of the energy conversion efficiency of the red phosphor is suppressed by decreasing the light density of the excitation light applied to first fluorescence emission component 17R, and therefore, light utilization efficiency of the wavelength converting light radiated from first fluorescence emission component 17R can be increased.

Fifth Modification

A fifth modification of the light source of the first exemplary embodiment will be described below with reference to FIG. 11. The fifth modification differs from the fourth modification in the configuration of the first wavelength converting unit. Therefore, a different portion between the fifth modification and the first exemplary embodiment will mainly be described.

One of the feature points of first wavelength converting unit 19 of the fifth modification is that first fluorescence emission component 17R of first wavelength converting unit 19 is formed in a plurality of recesses formed according to microlens array 205a.

Specifically, for example, reflecting film 202 made of Ag is formed over the whole surface of substrate 201 made of copper provided with a plurality of cylindrical recesses on the surface, and first fluorescence emission component 17R in which the red phosphor is mixed in the binder such as low-melting-point glass is formed in the cylindrical recess. Microlens array 205a is disposed according to first fluorescence emission component 17R. Heat radiation component 207 is attached to a side opposite to substrate 201. Heat radiation component 207 is configured by heat radiation substrate 208 such as a copper plate, heat radiation mechanism 209 such as a Peltier element, and heat radiation fin 210. At this point, a constant current is applied to heat radiation mechanism 209 such that first fluorescence emission component 17R is set to a given temperature, for example, 100° C. or less.

Figure 11:
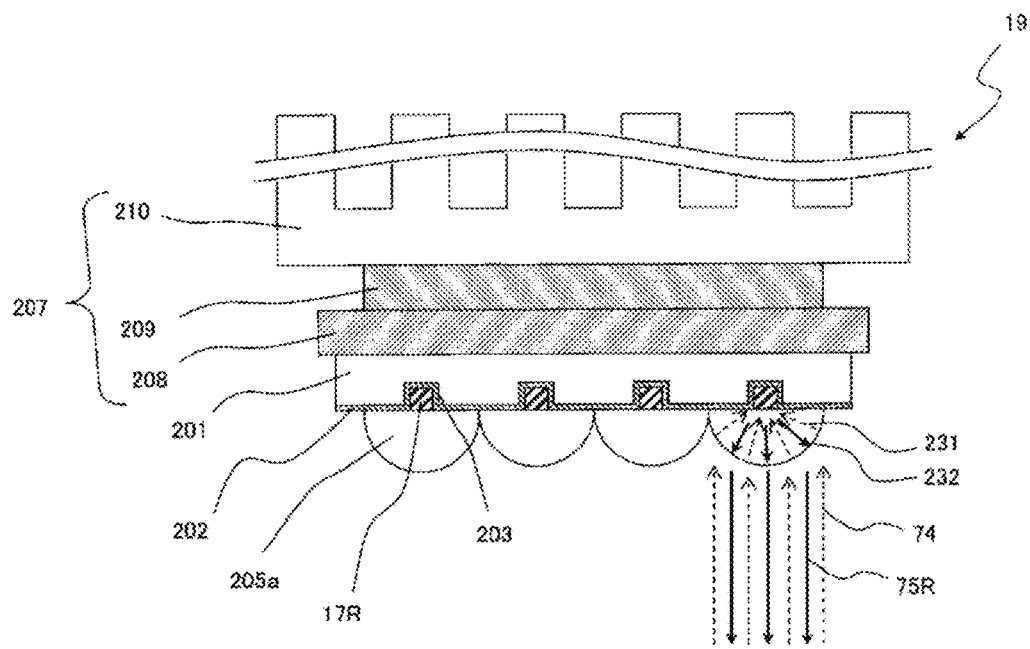
FIG. 11 is a view illustrating a fifth modification of the light source according to the first exemplary embodiment of the present invention.

In the configuration of FIG. 11, in excitation light 74, incident light 231 is refracted and converged by the microlens to be applied to the phosphor. Wavelength converting light 232 from the phosphor is emitted as wavelength converting light 75R while being collimated by the microlens. Therefore, the light can be coupled to the second converging lens while a light diffusion loss is decreased. Additionally, first fluorescence emission component 17R has a higher heat radiation effect because first fluorescence emission component 17R is covered with the high-heat radiation substrate.

As described above, using the configuration of the first modification, the degradation of the energy conversion efficiency of the red phosphor is suppressed by decreasing the light density of the excitation light applied to first fluorescence emission component 17R, and therefore, light utilization efficiency of the wavelength converting light radiated from first fluorescence emission component 17R can be increased.

The groove provided in substrate 201 may be a columnar groove, a conical groove, or a recess having a polygonal shape.

Second Exemplary Embodiment

A light source and an image projection apparatus according to a second exemplary embodiment of the present invention and modifications thereof will be described below with reference to FIGS. 12 to 18C.

Figure 12:
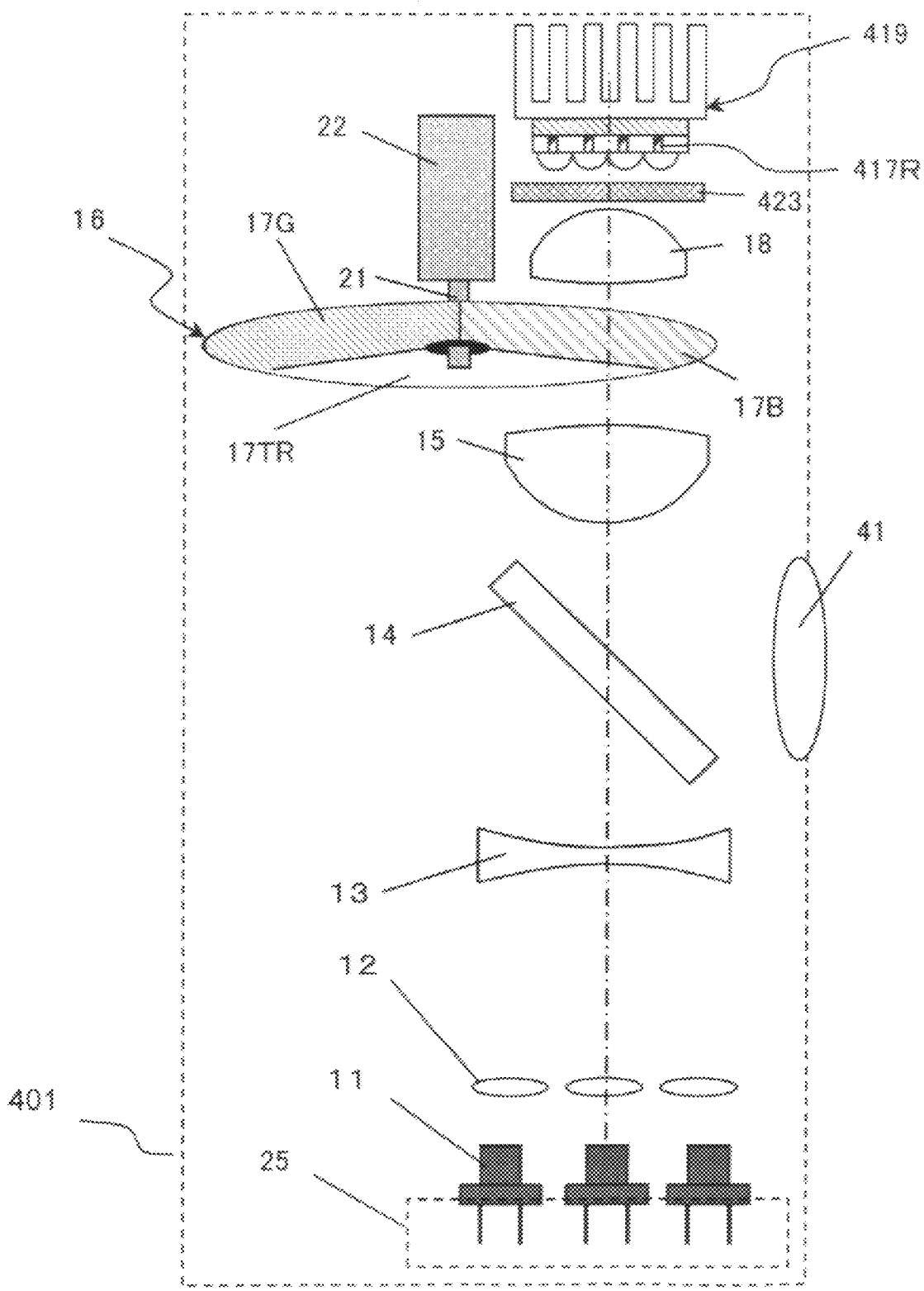
FIG. 12 is a view illustrating a configuration of a light source according to a second exemplary embodiment of the present invention.

FIG. 12 is a view illustrating a configuration of the light source according to the second exemplary embodiment of the present invention. A basic configuration of the light source of the second exemplary embodiment differs from that of light source 101 of the first exemplary embodiment only in the configuration to radiate the red light. Particularly, the light source of the second exemplary embodiment has the configuration in which the red light having the higher color purity can efficiently be radiated using the red phosphor having the wider full width at half maximum of the fluorescent spectrum. Therefore, a different portion between the second exemplary embodiment and the first exemplary embodiment will mainly be described.

Light source 401 of the second exemplary embodiment is mainly configured by semiconductor luminescence element 11 that is, for example, a nitride semiconductor laser radiating the near-ultraviolet light, first wavelength converting unit 419 that converts the near-ultraviolet light radiated from semiconductor luminescence element 11 into the red light, wavelength cut filter 423 that partially cuts the spectrum of the wavelength converting light from the first wavelength converting unit, second converging lens 18 that collimates the excitation light, and second wavelength converting unit 16 that converts the near-ultraviolet light into the blue light and the green light.

As to the configuration of second wavelength converting unit 16, similarly to the first exemplary embodiment, second fluorescence emission component 17G, third fluorescence emission component 17B, and light transmission region 17TR are formed in each region in the vicinity of the predetermined outer periphery of substrate 40 that is the disc-shaped aluminum alloy plate. For example, each of second fluorescence emission component 17G and third fluorescence emission component 17B is a phosphor film that is formed into an arc shape with a thickness of 100 µm to 500 µm and a width of 5 mm, for example. In the phosphor film of second fluorescence emission component 17G, the green phosphor such as Ce-activated $Y_3(Al,Ga)_5O_{12}$ is mixed in the binder. In the phosphor film of third fluorescence emission component 17B, the blue phosphor such as Eu-activated $Sr_3MgSi_2O_8$ is mixed in the binder. Light transmission region 17TR is formed by making an opening in substrate 40. For example, first wavelength converting unit 419 has the configuration similar to that of the fifth modification of the first exemplary embodiment, and is disposed at a position separated from second wavelength converting unit 16. One of the features of the second exemplary embodiment is that a long-wavelength phosphor is used as the phosphor of first fluorescence emission component 17R used in first wavelength converting unit 419. In the long-wavelength phosphor, the trivalent europium is used in a fluorescent process of Eu-activated (Sr, Ca)$AlSiN_3$, Eu-activated α type SiAlON, or Eu-activated $SrSiO_3$, the emission wavelength is located in yellow to red regions, and the half-value width of the fluorescent spectrum is relatively wide, for example, 40 nm to 120 nm. Wavelength cut filter 423 is disposed between first wavelength converting unit 419 and second wavelength converting unit 16. For example, wavelength cut filter 423 has a configuration in which a distribution Bragg reflector (DBR) film is formed on the glass substrate to partially cut the fluorescent spectrum from first wavelength converting unit 419. The DBR film reflects so-called green to yellow light having the wavelengths of 500 nm to 590 nm, and transmits the light in the near-ultraviolet region where the wavelength ranges from 350 nm to 430 nm and the light in the red region where the wavelength ranges from 590 nm to 700 nm.

As described above, the configuration of light source 401 of the second exemplary embodiment is substantially similar to that of the first exemplary embodiment except for first wavelength converting unit 419 and wavelength cut filter 423.

Because the operation of light source 401 of the second exemplary embodiment is substantially identical to that of the first exemplary embodiment, the description of the operation to irradiate blue phosphor 17B and green phosphor 17G provided in second wavelength converting unit 16 with the excitation light to emit the fluorescent light is omitted. The operation to emit the red light will be described below with reference to FIG. 13.

For example, output light 70 that is emitted from semiconductor luminescence element 11 with the center wavelength of 405 nm is transmitted through collimator lens 12, concave lens 13, and dichroic mirror 14, converged by first converging lens 15, and becomes output light 72 converged into second wavelength converting unit 16.

When transmission region 17TR is disposed on the main optical axis while second wavelength converting unit 16 rotates, output light 72 is transmitted through transmission region 17TR to pass through second converging lens 18 and wavelength cut filter 423, and first fluorescence emission component 417R of first wavelength converting unit 419 is irradiated with output light 72. In the long-wavelength phosphor contained in first fluorescence emission component 417R, output light 72 becomes wavelength converting light 475R to move on to wavelength cut filter 423. Wavelength converting light 475R has the emission spectrum peak wavelength ranging from 590 nm to 630 nm and the full width at half maximum ranging from 40 nm to 120 nm. When passing through wavelength cut filter 423, wavelength converting light 475R becomes wavelength converting light 476R in which a part of the spectrum, specifically, the wavelengths of 590 nm or less in the green to yellow regions are cut. Then, wavelength converting light 476R moves on to second converging lens 18. Wavelength converting light 476R propagates in second converging lens 18, transmission region 17TR, and first converging lens 15 to become wavelength converting diffused light 78R. Then, wavelength converting diffused light 78R is emitted from light source 401 as wavelength converting light 79 through dichroic mirror 14 and converging lens 41.

Like the description in FIG. 2, the light is emitted from projection apparatus 199 as video light 89 capable of being projected to the predetermined screen (not illustrated).

An effect of the configuration according to the second exemplary embodiment of the present invention will be described with reference to FIGS. 14A to 16B.

In FIGS. 14A to 14D, it is assumed that the emission spectrum of the long-wavelength phosphor has the full width at half maximum of 90 nm and an intensity distribution of a Gaussian distribution. It is also assumed that wavelength cut filter 423 is configured to cut off wavelengths of 590 nm or less.

Figure 14A:
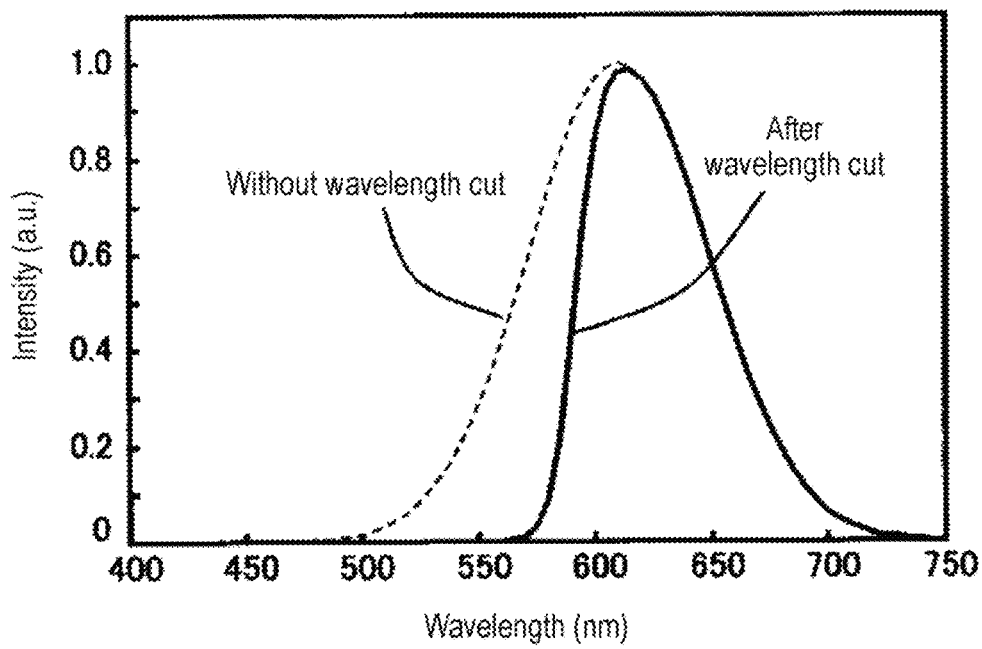
FIG. 14A is a view illustrating spectral shapes before and after wavelength cut in a wavelength cut filter of the light source according to the second exemplary embodiment of the present invention.
Figure 14B:
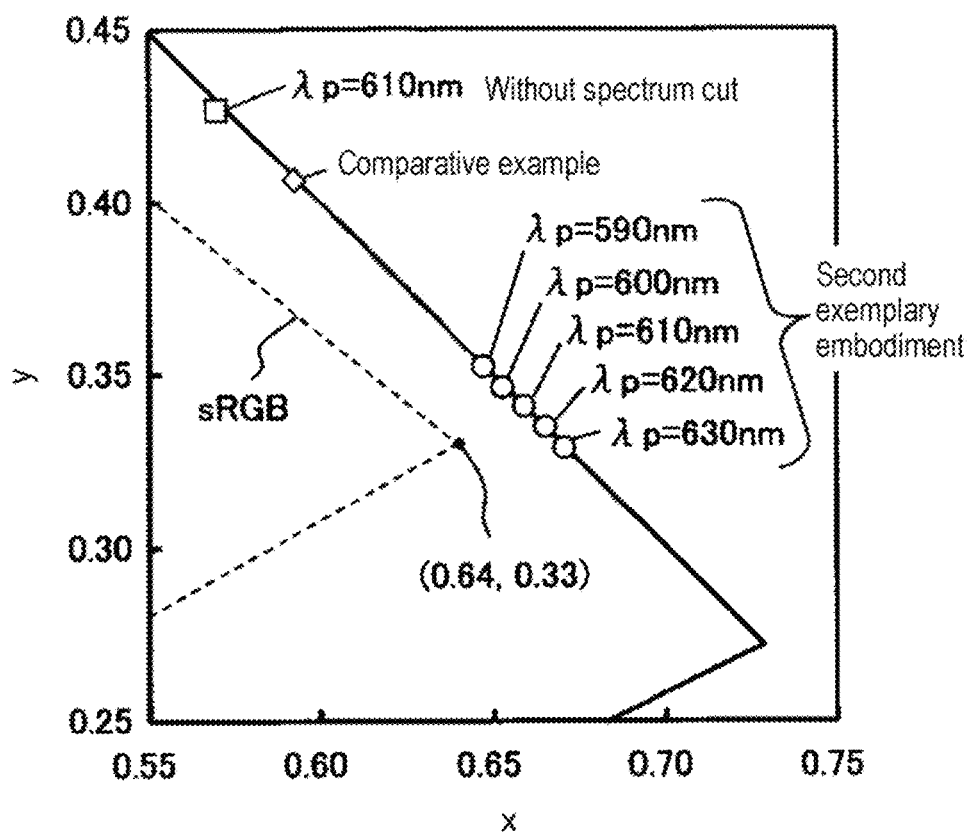
FIG. 14B is a view illustrating chromaticity coordinates of a red phosphor in the light source according to the second exemplary embodiment of the present invention.

In FIG. 14A, a dotted line indicates a spectrum that is calculated using the peak wavelength of 610 nm and the full width at half maximum of 90 nm. As indicated by a solid line, the wavelengths of 590 nm or less are cut by wavelength cut filter 423. FIG. 14B illustrates chromaticity coordinates in the case where the spectrum having the peak wavelengths of 590 nm to 630 nm and the full width at half maximum of 90 nm is cut by wavelength cut filter 423. The red coordinates are (0.64, 0.33) in sRGB, and x≥0.64 is preferred for the red coordinates of the light source. The red light of the second exemplary embodiment satisfies the above specification. A desirable mode from the efficiency viewpoint of the second exemplary embodiment will be described with reference to FIG. 14C. FIG. 14C illustrates peak wavelength dependence of wavelength converting light 475R with energy transmittance (energy of wavelength converting light 476R/energy of wavelength converting light 475R) with which wavelength converting light 475R from first wavelength converting unit 419 is transmitted through wavelength cut filter 423 and peak wavelength dependence of luminance conversion efficiency (energy of luminance/wavelength converting light 475R of wavelength converting light 476R) when the cut wavelength of wavelength cut filter 423 is set to 590 nm. When the peak wavelength of wavelength converting light 475R is lengthened, because an amount of wavelength converting light 475R cut by wavelength cut filter 423 decreases, a luminosity factor of the spectrum decreases although the energy transmittance increases, and therefore the luminance decreases. The luminance conversion efficiency has a maximum value, and becomes 150 lm/W at the peak wavelengths of 590 nm to 630 nm. Therefore, preferably, the long-wavelength phosphor located in this range is used as the phosphor for first wavelength converting unit 419. More preferably, the phosphor located between the peak wavelengths of 600 nm and 620 nm is used.

An advantageous effect of the light source according to the second exemplary embodiment of the present invention will be described by comparing the light source of the second exemplary embodiment to one in which the red phosphor is formed on second wavelength converting unit 16 (hereinafter, referred to as a comparative example). In the light source in which the red phosphor is formed on first wavelength converting unit 16, a wavelength cut filter similar to wavelength cut filter 423 is formed on the surface of the red phosphor of second wavelength converting unit 16 in order to improve the color purity of the red phosphor (this is because the light of the green phosphor is cut in the case where wavelength cut filter 423 is disposed in a site other than the surface of the red phosphor).

Figure 15A:
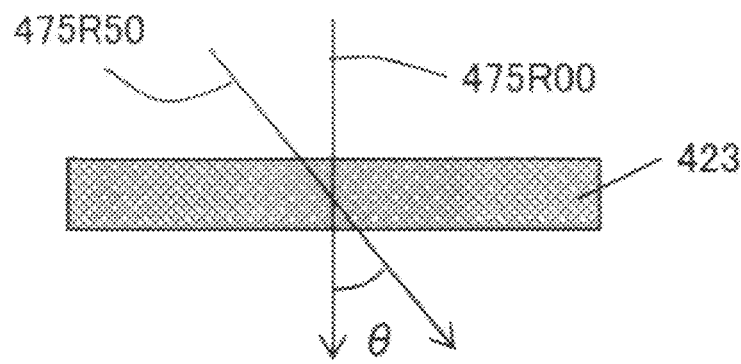
FIG. 15A is a view illustrating a direction of the light incident on the wavelength cut filter according to the second exemplary embodiment of the present invention.
Figure 15B:
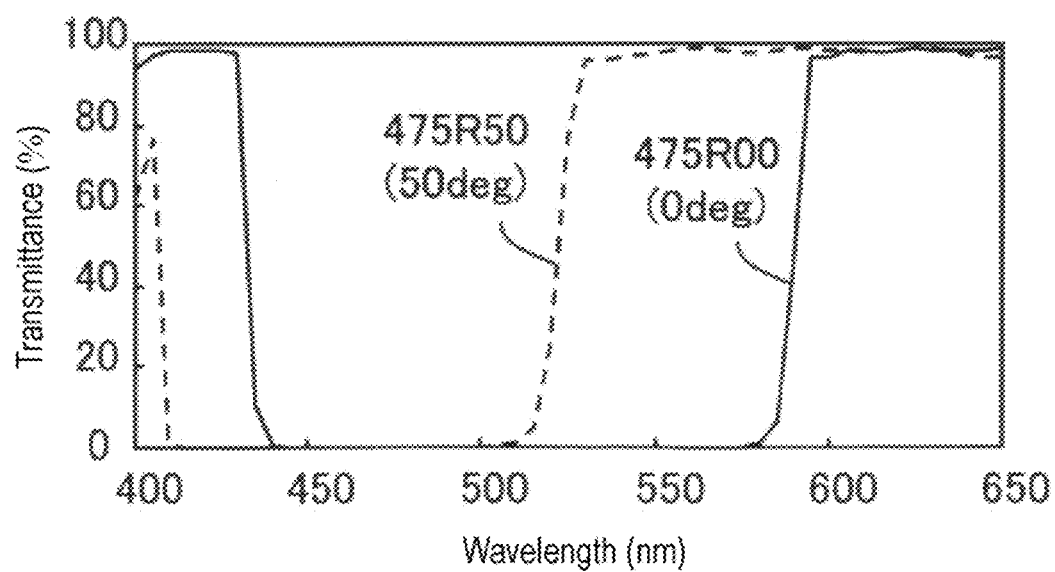
FIG. 15B is a view illustrating angle dependence on a transmittance in the wavelength cut filter according to the second exemplary embodiment of the present invention.
Figure 15C:
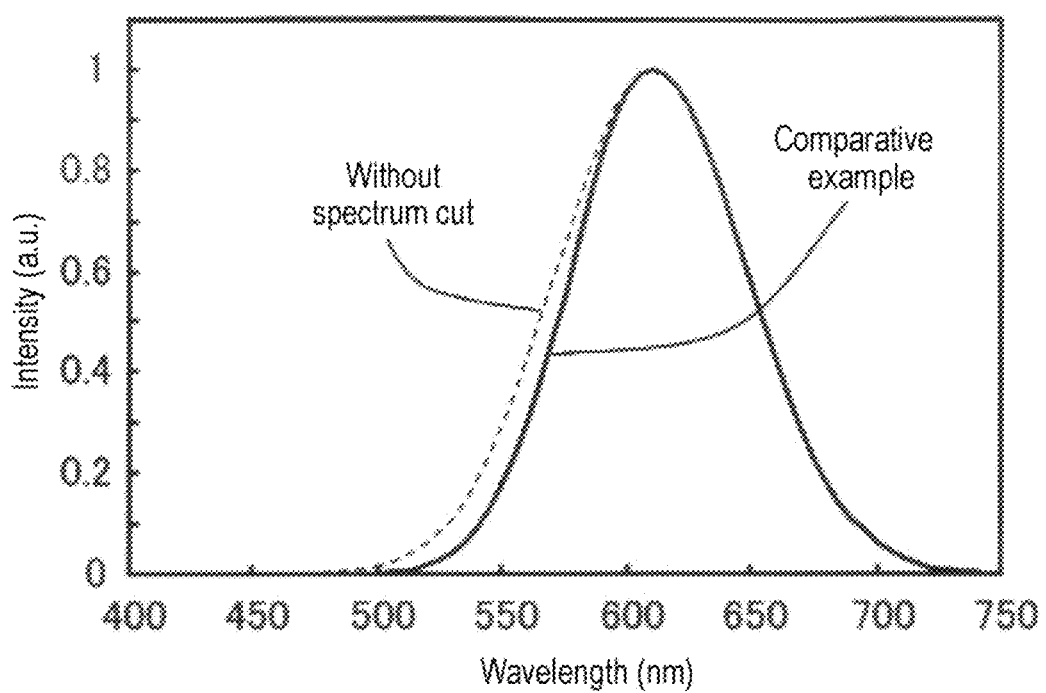
FIG. 15C is a view illustrating spectral shapes before and after the wavelength cut in the wavelength cut filter.

FIG. 15A is a sectional view illustrating an incident direction of wavelength cut filter 423. FIG. 15B is a view illustrating angle dependence of dichroic mirror 14. FIG. 15C illustrates a spectrum of a comparative example.

Figure 13:
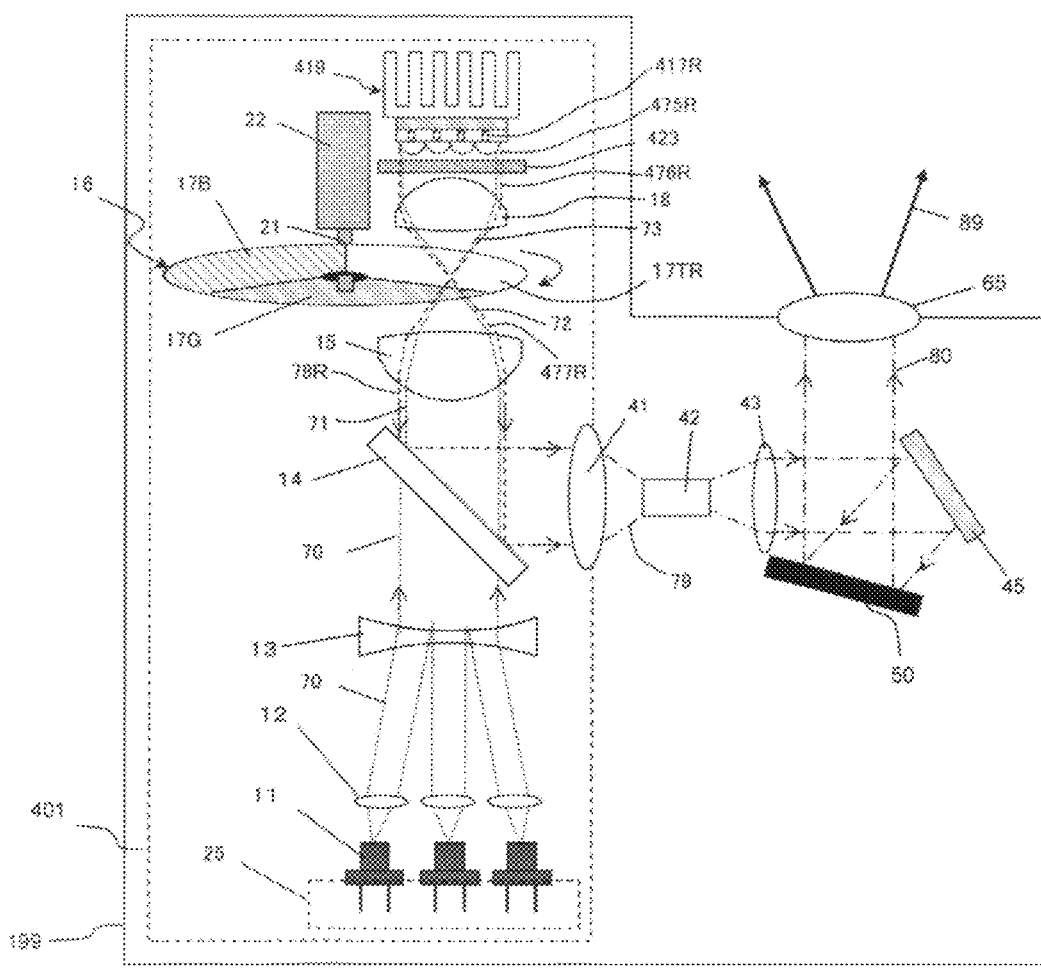
FIG. 13 is a view illustrating the light source according to the second exemplary embodiment of the present invention and a projection apparatus that emits red light in operation.

For example, the wavelength cut filter has the incident angle dependence of the cut wavelength, and the cut wavelength deviates from a target value when the incident angle increases as illustrated in FIGS. 15A and 15B. Specifically, even if cut wavelength is set to 590 nm with respect to incident light 475R00 vertically incident on the surface of wavelength cut filter 423, for example, the cut wavelength becomes 510 nm with respect to incident light 475R50 having an incident angle θ of 50 degrees (deg), and the effect decreases. The effect of wavelength cut filter 423 decreases because actual wavelength converting light 72, which is emitted from first wavelength converting unit 16 and taken in first converging lens 15, has output angles of at least −60 degrees to +60 degrees. Specifically, FIG. 15C illustrates a result in which the spectrum including the angle dependence of the characteristic of wavelength cut filter 423 is calculated on the condition similar to that in FIG. 14A in a structure of the comparative example (a structure in which wavelength cut filter 423 is formed on the surface of the phosphor of second wavelength converting unit 16). FIG. 14B illustrates chromaticity coordinates in a conventional structure. As can be seen from FIGS. 14B and 15C, the wavelength cut effect is insufficient, and does not satisfy the chromaticity coordinates of x≥0.64. On the other hand, as illustrated in FIG. 13, in the second exemplary embodiment, because wavelength converting light 475R is substantially vertically incident on wavelength cut filter 423, the light having the wavelengths of 590 nm or less can sufficiently be cut, and the light source that emits the higher-color-purity red light can be made.

Figure 16A:
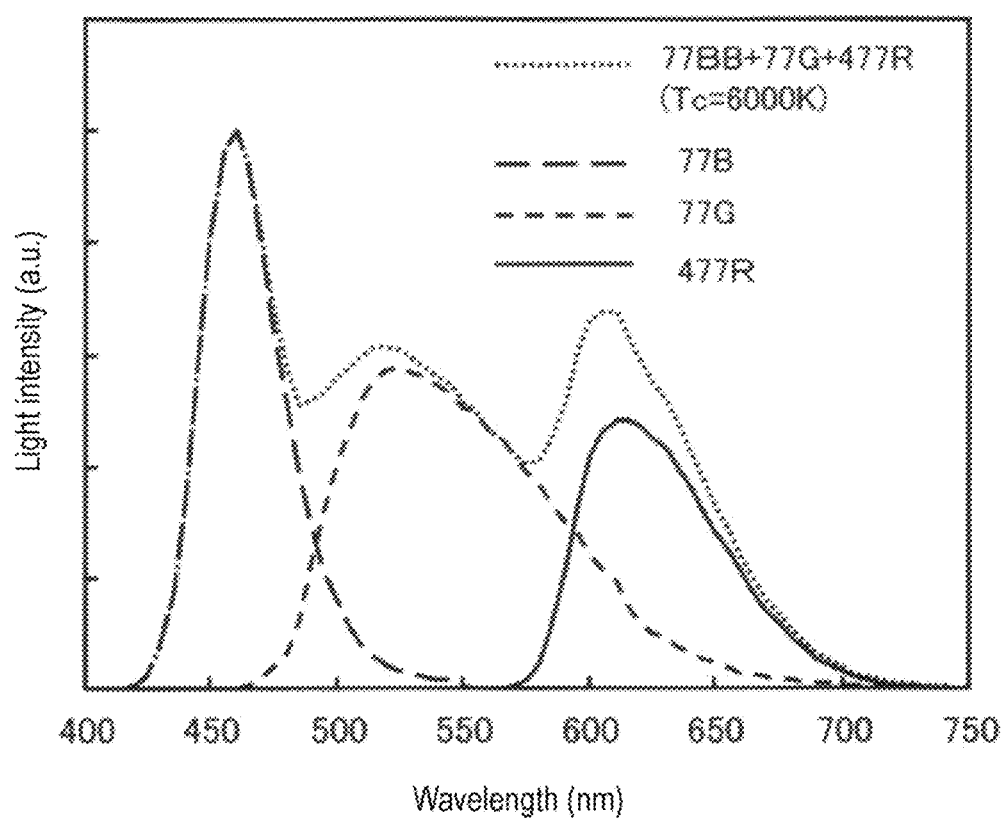
FIG. 16A is a view illustrating a spectrum of the light radiated from a phosphor according to the second exemplary embodiment of the present invention.
Figure 16B:
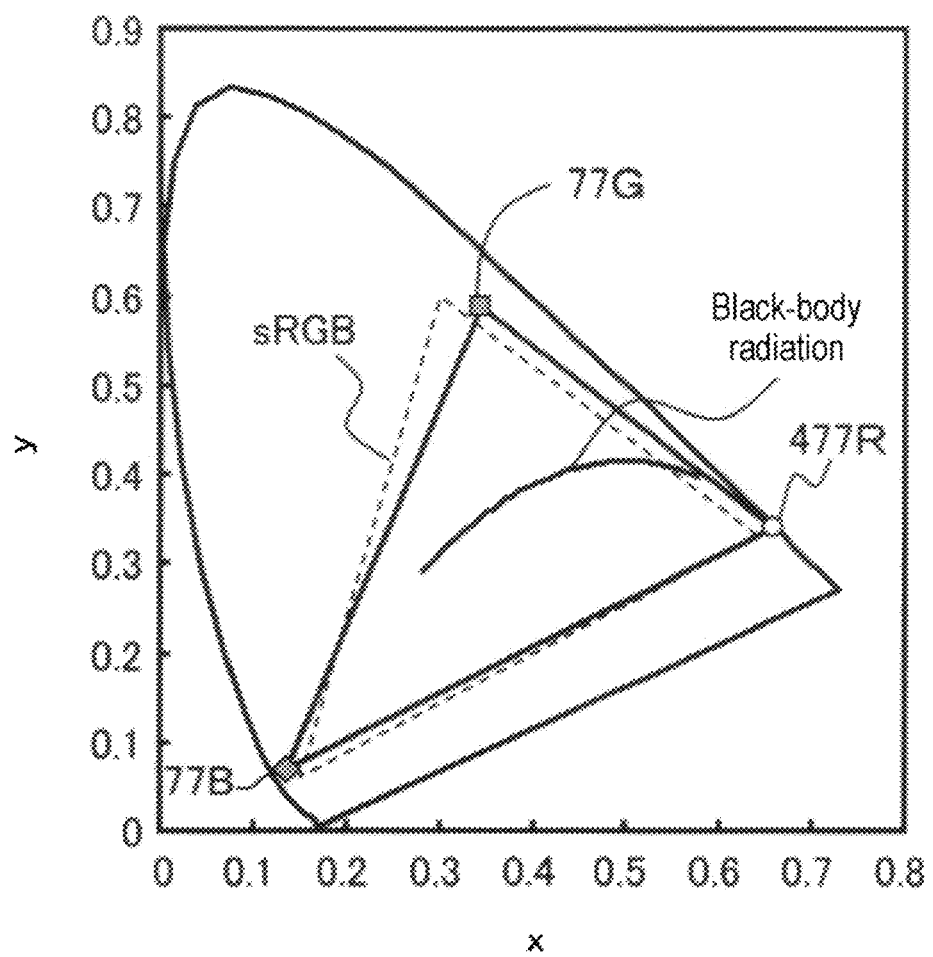
FIG. 16B is a view illustrating chromaticity coordinates of blue light, green light, and red light, which are emitted from a projection lens of the second exemplary embodiment of the present invention.

FIGS. 16A and 16B illustrate an example in which the emission spectrum of light source 401 is designed based on the above effect. FIG. 16A illustrates a spectrum of wavelength converting light 79 emitted from light source 401. In light source 401, wavelength converting light 477R that is the red light radiated from first fluorescence emission component 417R, wavelength converting light 77G that is the green light radiated from second fluorescence emission component 17G, and wavelength converting light 77B that is the blue light radiated from third fluorescence emission component 17B are emitted at constant time intervals, and the white light having the color temperature of 6000K is radiated as the temporally-averaged spectrum. At this point, Ce-activated $Y_3(Al,Ga)_5O_{12}$ is used as the phosphor radiating the green light, Eu-activated $Sr_3MgSi_2O_8$ is used as the phosphor radiating the blue light, and it is assumed that the fluorescent spectrum from the long-wavelength phosphor having the peak wavelength of 610 nm and the half-value width of 90 nm passes through the wavelength cut filter (cut wavelength of 590 nm) with respect to the red light. FIG. 16B illustrates a spectrum of each color in FIG. 16A in terms of a color space. As can be seen from FIG. 16B, it is found that the spectrum can substantially cover sRGB that is a display standard.

Specifically, for example, the long-wavelength phosphor having the above configuration can be made using a Eu-activated $(Sr,Ca)AlSiN_3$ phosphor, a Eu-activated α type SiAlON phosphor, or a Eu-activated $SrSiO_3$ phosphor.

At this point, excitation light 70 can be incident on first fluorescence emission component 417R while being divided by first wavelength converting unit 419, and the conversion efficiency degradation in the phosphor can be suppressed by an increase in light excitation density. In first fluorescence emission component 417R, the heat generated by the phosphor can be radiated by the heat radiation mechanism. As a result, the conversion efficiency degradation caused by the temperature rise of first fluorescence emission component 417R can be suppressed. Additionally, the light from first fluorescence emission component 417R can be incident on the wavelength cut filter as the substantially parallel light. For this reason, even if the phosphor having a wider spectral line width is used as the long-wavelength phosphor, wavelength converting light 477R that is the higher-color-purity red light can be radiated with high efficiency by the wavelength cut filter. Therefore, the light source having the higher color reproducibility of the output light and the higher conversion efficiency can be provided.

First Modification

A first modification of the light source according to the second exemplary embodiment of the present invention will be described below with reference to FIGS. 17A to 17C. In the first modification, a desirable mode will be described by illustrating a calculation result for the half-value width of the long-wavelength phosphor ranging from 50 nm and 110 nm.

Figure 17A:
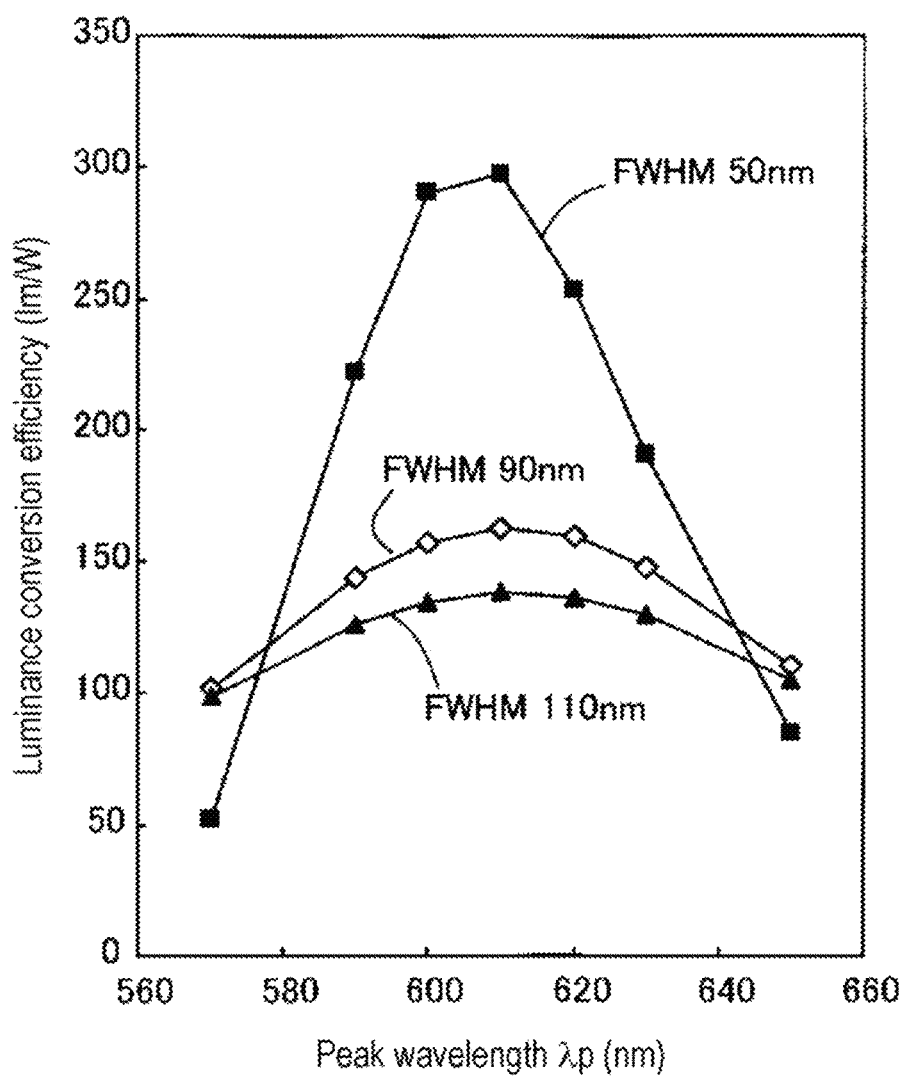
FIG. 17A is a view illustrating a spectrum of the light radiated from a phosphor according to a first modification of the second exemplary embodiment of the present invention.
Figure 17B:
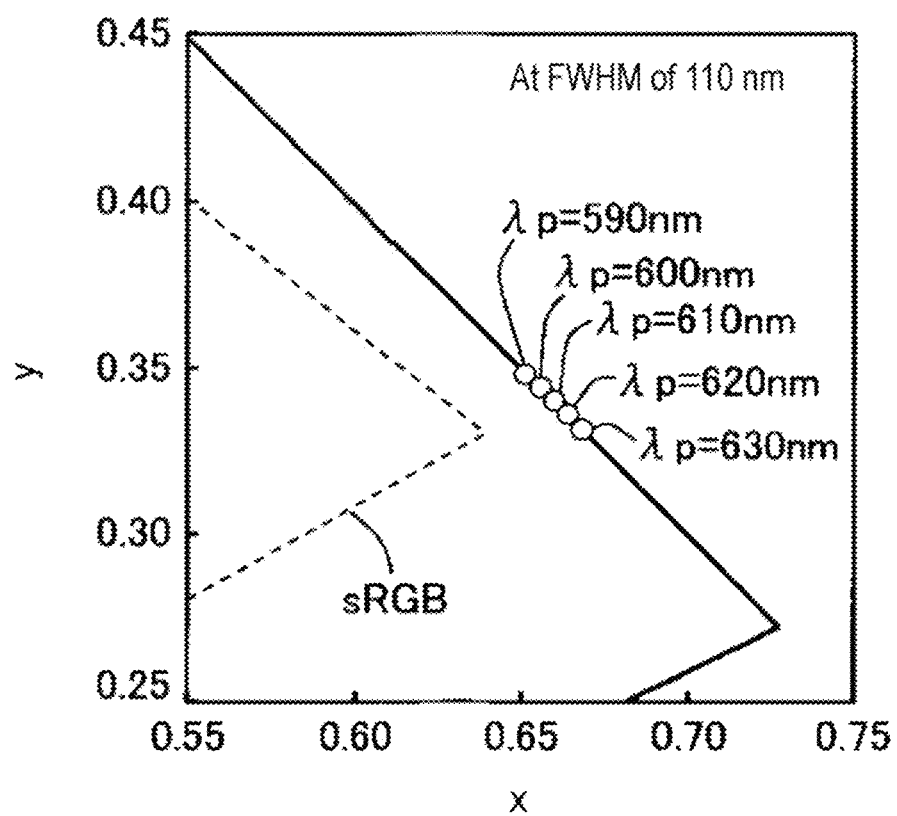
FIG. 17B is a view illustrating chromaticity coordinates of a peak spectrum emitted from a projection lens of the second exemplary embodiment of the present invention.
Figure 17C:
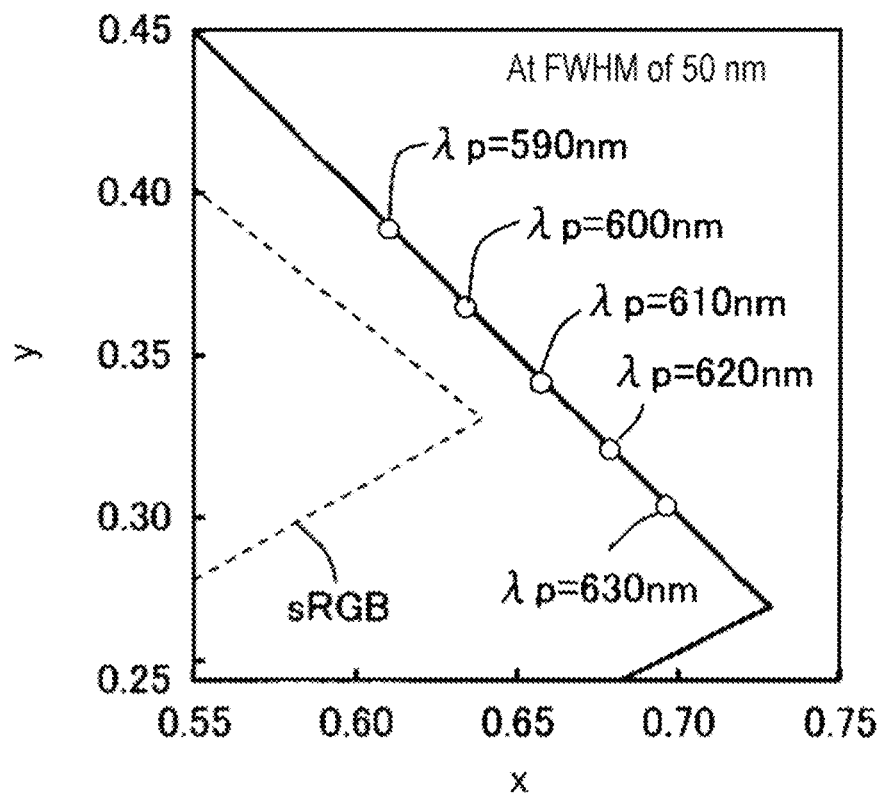
FIG. 17C is a view illustrating chromaticity coordinates of a peak spectrum emitted from a projection lens of the second exemplary embodiment of the present invention.

FIG. 17A illustrates the peak wavelength dependence of luminance conversion efficiency with half-value widths of 50 nm and 110 nm in addition to the calculation result with the half-value width of 90 nm of the second exemplary embodiment. In both cases, the luminance conversion efficiency has the maximum value near the peak wavelength of 610 nm, and the efficiency increases as the half-value width is narrowed. On the other hand, as to the chromaticity coordinates indicating the color purity, FIG. 17B illustrates the peak wavelength dependence of the chromaticity coordinates with the full width at half maximum of 110 nm, and FIG. 17C illustrates the peak wavelength dependence of the chromaticity coordinates with the full width at half maximum of 50 nm. From these results, the peak wavelength can be designed in the range of 605 nm to 620 nm when the full width at half maximum is 50 nm, and the peak wavelength can be designed in the range of 590 nm to 630 nm when the full width at half maximum is 110 nm, which allows the luminance conversion efficiency to be increased while the color purity is increased.

Specifically, for example, an InP/ZnS core-shell quantum dot phosphor in which the full width at half maximum ranges from 40 nm to 60 nm, or a Eu-activated $CaAlSiN_3$ phosphor and a Eu-activated $CaAlSiN_3$—$Si_2N_2O$ phosphor, in which the full width at half maximum ranges from 100 nm to 120 nm, can be used as the phosphor.

Second Modification

A second modification of the light source according to the second exemplary embodiment of the present invention will be described below with reference to FIGS. 18A to 18C. The second modification differs from the second exemplary embodiment in second wavelength converting unit 16. Therefore, a different portion between the second modification and the second exemplary embodiment will mainly be described.

Figure 18A:
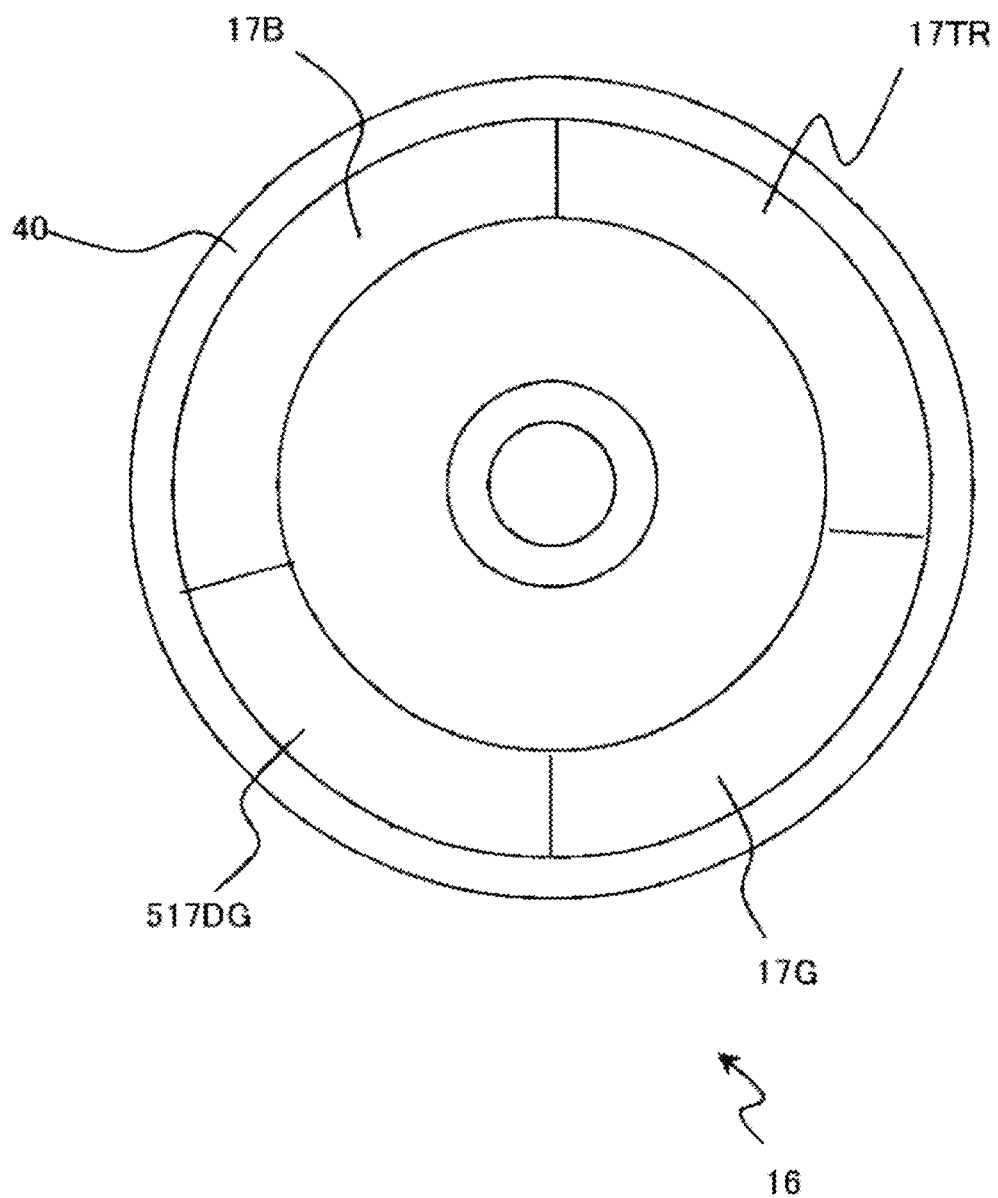
FIG. 18A is a view illustrating a configuration of a second wavelength converting unit according to a second modification of the second exemplary embodiment of the present invention.

As to the configuration of second wavelength converting unit 16 of the second modification, as illustrated in FIG. 18A, for example, second fluorescence emission component 17G, third fluorescence emission component 17B, fourth fluorescence emission component 517DG, and light transmission region 17TR are formed in each region in the vicinity of the predetermined outer periphery of substrate 40 that is the disc-shaped aluminum alloy plate. For example, third fluorescence emission component 17B is a phosphor film that is formed into an arc shape with a thickness of 100 μm to 500 μm and a width of 5 mm. For example, the phosphor film is made by mixing a blue phosphor having a principal component of Eu-activated $Sr_3MgSi_2O_8$ in an organic transparent material such as dimethyl silicone or a binder that is an inorganic transparent material such as low-melting-point glass. For example, second fluorescence emission component 17G is formed by mixing the green phosphor having the principal component of Ce-activated $Y_3(Al,Ga)_5O_{12}$ in the organic or inorganic transparent material, and similarly, fourth fluorescence emission component 517DG is formed by mixing the deep-green phosphor having the principal component of Eu-activated SiAlON in the organic or inorganic transparent material. For example, as illustrated in FIG. 1C, light transmission region 17TR is formed by making an opening in substrate 40.

Figure 18B:
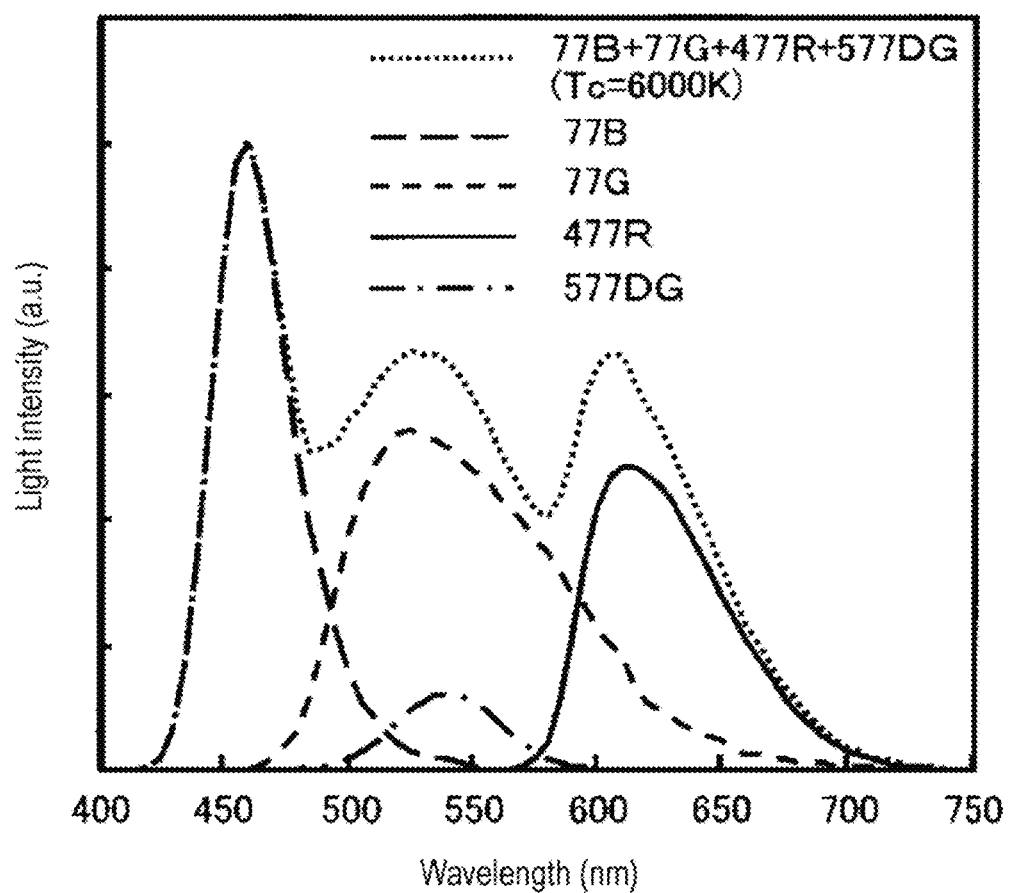
FIG. 18B is a view illustrating a spectrum of the light radiated from a phosphor according to the second modification of the second exemplary embodiment of the present invention.
Figure 18C:
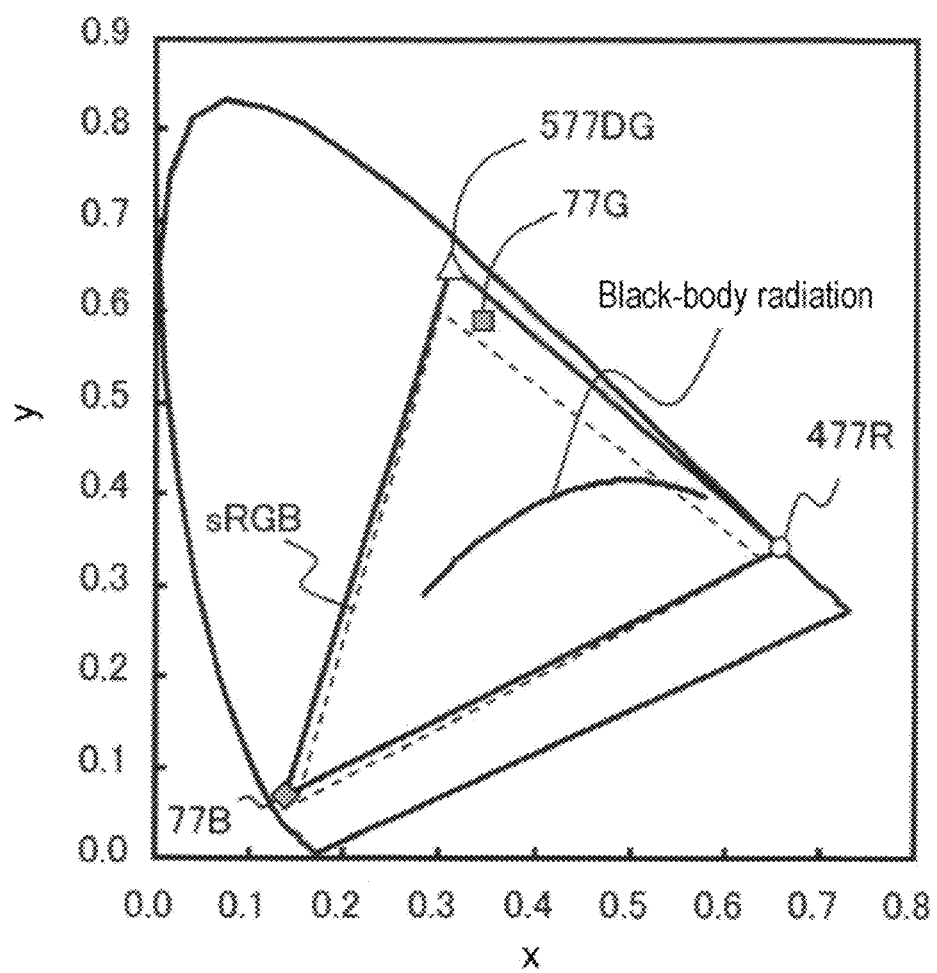
FIG. 18C is a view illustrating chromaticity coordinates of blue light, green light, and red light, which are emitted from a projection lens of the second modification of the second exemplary embodiment of the present invention.

FIGS. 18B and 18C illustrate an example in which the emission spectrum is designed in the configuration. FIG. 18B illustrates a spectrum of wavelength converting light 79 emitted from light source 401. In light source 401, wavelength converting light 477R that is the red light radiated from first fluorescence emission component 417R, wavelength converting light 77G that is the green light radiated from second fluorescence emission component 17G, wavelength converting light 77B that is the blue light radiated from third fluorescence emission component 17B, and wavelength converting light 577DG that is the deep-green light radiated from fourth fluorescence emission component 417DG are emitted at constant time intervals, and the white light having the color temperature of 6000K is radiated as the temporally-averaged spectrum. As to the phosphor of the second modification, preferably, Eu-activated (Sa,Ca)AlSiN is used as the phosphor radiating the red light, Eu-activated $Sr_3MgSi_2O_8$ is used as the phosphor radiating the blue light, Ce-activated $Y_3(Al,Ga)_5O_{12}$ is used as the phosphor radiating the green light, and Eu-activated SiAlON is used as the phosphor radiating the deep-green light.

In the second modification, the green color purity can be enhanced using the deep-green phosphor compared with the case where only the green phosphor is used. Therefore, the light source having the better color reproducibility and higher conversion efficiency can be provided.

Third Exemplary Embodiment

Figure 19:
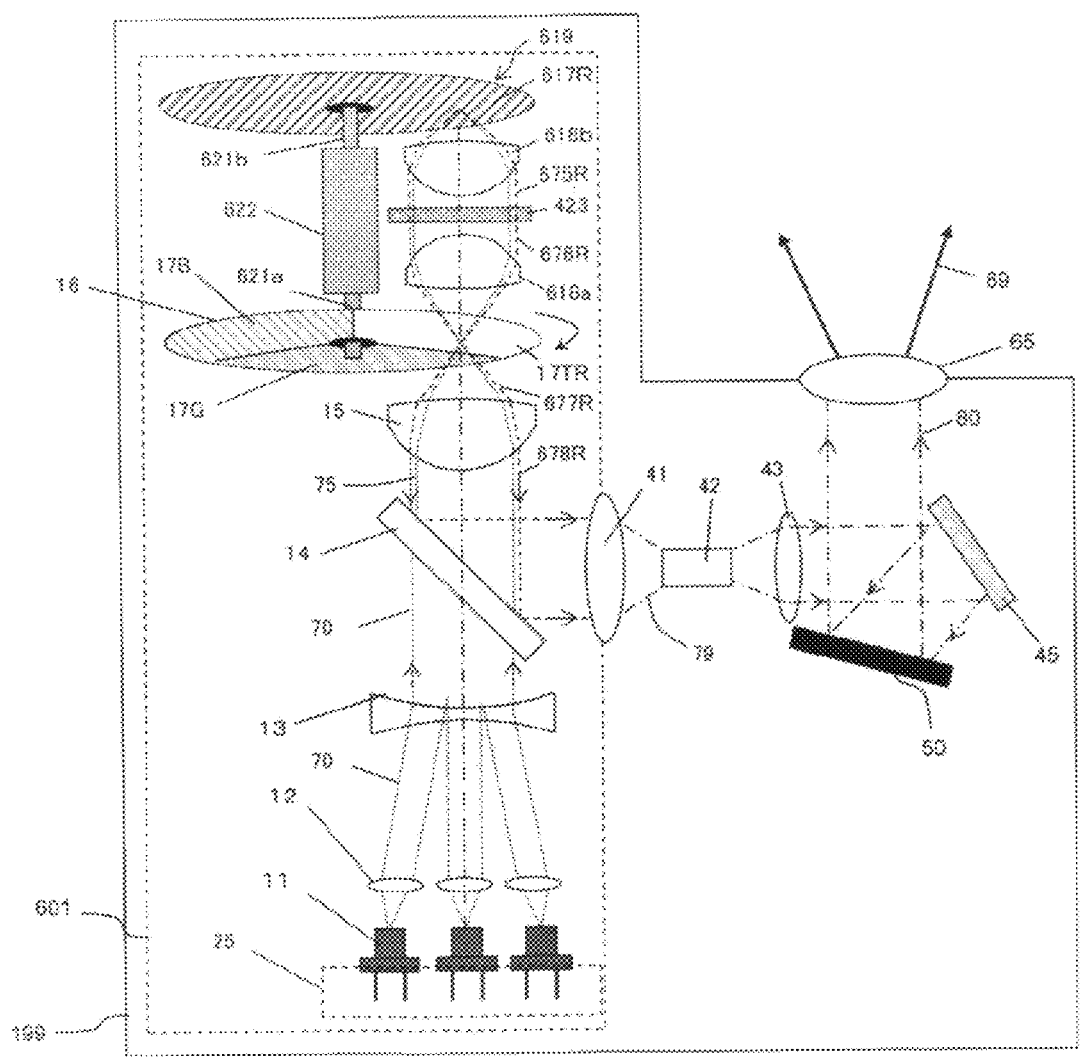
FIG. 19 is a view illustrating a light source and a projection apparatus according to a third exemplary embodiment of the present invention.

A light source and a projection apparatus according to the third exemplary embodiment of the present invention will be described below with reference to FIG. 19. FIG. 19 is a view illustrating configurations and operations of the light source and the projection apparatus according to the third exemplary embodiment of the present invention. A basic configuration of the light source of the third modification differs from that of light source 401 and image projection apparatus 199 of the second exemplary embodiment only in the configuration to radiate the red light. Therefore, a different portion between the third exemplary embodiment and the second exemplary embodiment will mainly be described. Similarly to the second exemplary embodiment, the light source of the third exemplary embodiment has the configuration in which the red light having the higher color purity can efficiently be radiated using the red phosphor having the wider full width at half maximum of the fluorescent spectrum.

Light source 601 of the third exemplary embodiment is mainly configured by semiconductor luminescence element 11 that is, for example, a nitride semiconductor laser radiating the near-ultraviolet light, first wavelength converting unit 619 that converts the near-ultraviolet light radiated from semiconductor luminescence element 11 into the red light, second converging lens 618a that collimates the near-ultraviolet light transmitted through first converging lens 15, wavelength cut filter 423 that partially cuts the wavelength of the light from the first wavelength converting unit, second converging lens 618b that converges the light into first wavelength converting unit 619, and second wavelength converting unit 16 that converts the near-ultraviolet light into the blue light and the green light.

In first wavelength converting unit 619, first fluorescence emission component 617R is provided on the disc-shaped base. Specifically, for example, first fluorescence emission component 617R is a phosphor film that is formed into an arc shape with a thickness of 100 µm to 500 µm and a width of 5 mm. For example, the phosphor film is made by mixing Eu-activated (Sr,Ca)AlSiN in an organic transparent material such as dimethyl silicone or a binder that is an inorganic transparent material such as low-melting-point glass.

For example, first wavelength converting unit 619 and second wavelength converting unit 16 are simultaneously rotated at a predetermined rotation speed by a double-shaft motor. Specifically, rotation shaft 621a that rotates second wavelength converting unit 16 fixed thereto and rotation shaft 621b coaxial with rotation shaft 621a are provided in rotation mechanism 622. Rotation shaft 621b is provided on the side opposite to the rotation shaft 621a with respect to rotation mechanism 622. First wavelength converting unit 619 fixed to rotation shaft 621b rotates. In the above configuration, first wavelength converting unit 619 and second wavelength converting unit 16 can be rotated by one driving component.

More particularly, light source 601 including first wavelength converting unit 619, second wavelength converting unit 16, and wavelength cut filter 423, the optical system radiating the red light is configured as follows. Dichroic mirror 14, first converging lens 15, second wavelength converting unit 16, second converging lens 618a, wavelength cut filter 423, and second converging lens 618b are sequentially arranged on the main optical axis of light source 601, and first fluorescence emission component 617R of first wavelength converting unit 619 is disposed at a focal position of second converging lens 618b.

In the above configuration, the light source according to the third exemplary embodiment is operated as follows. The operation identical to that of the second exemplary embodiment, particularly, the excitation light irradiation and emission operation with respect to the blue phosphor 17B and green phosphor 17G provided in second wavelength converting unit 16 are omitted. On the other hand, the operation to emit the red light is performed as follows. Output light 70 that is the excitation light emitted from semiconductor luminescence element 11 is transmitted through collimator lens 12, concave lens 13, and dichroic mirror 14, and converged by first converging lens 15. Then, output light 70 is transmitted through transmission region 17TR of second wavelength converting unit 16, and converged into first fluorescence emission component 617R of first wavelength converting unit 619 through second converging lens 618a, wavelength cut filter 423, and second converging lens 618b. Output light 70 is converted into the fluorescent light having the emission peak wavelengths of 580 nm to 670 nm by the long-wavelength phosphor of first fluorescence emission component 617R. At this point, for example, first wavelength converting unit 619 is rotated at 120 Hz by rotation mechanism 622 similarly to second wavelength converting unit 16.

Therefore, the temperature rise at fluorescence emission component 617R caused by the continuous irradiation of a specific position of fluorescence emission component 617R with output light 70 can be prevented.

The wavelength converting light emitted from first fluorescence emission component 617R becomes wavelength converting light 675R that is the substantially-collimated light by second converging lens 618b. Wavelength converting light 675R is vertically incident on and transmitted through wavelength cut filter 423. At this point, the light having the wavelengths of 590 nm or less is cut, and wavelength converting light 675R becomes wavelength converting light 676R that is the higher-color-purity red light, and is converged into transmission region 17TR of second wavelength converting unit 16 through second converging lens 618a. Wavelength converting light 677R passing through transmission region 17TR becomes wavelength converting light 678R that is the collimated light by first converging lens 15, and wavelength converting light 678R is emitted from light source 601 through dichroic mirror 14.

In the configuration of FIG. 19, similarly to the second exemplary embodiment of the present invention, even if the phosphor having the wider spectral line width is used as the red phosphor, the higher-color-purity red light can be emitted by collimating and transmitting the fluorescent light through wavelength cut filter 423. Therefore, the light source having the higher efficiency and the higher color reproducibility of the output light can be provided.

Either an organic material or an inorganic material may be used as the binder of first fluorescence emission component 617R.

Fourth Exemplary Embodiment

Figure 20A:
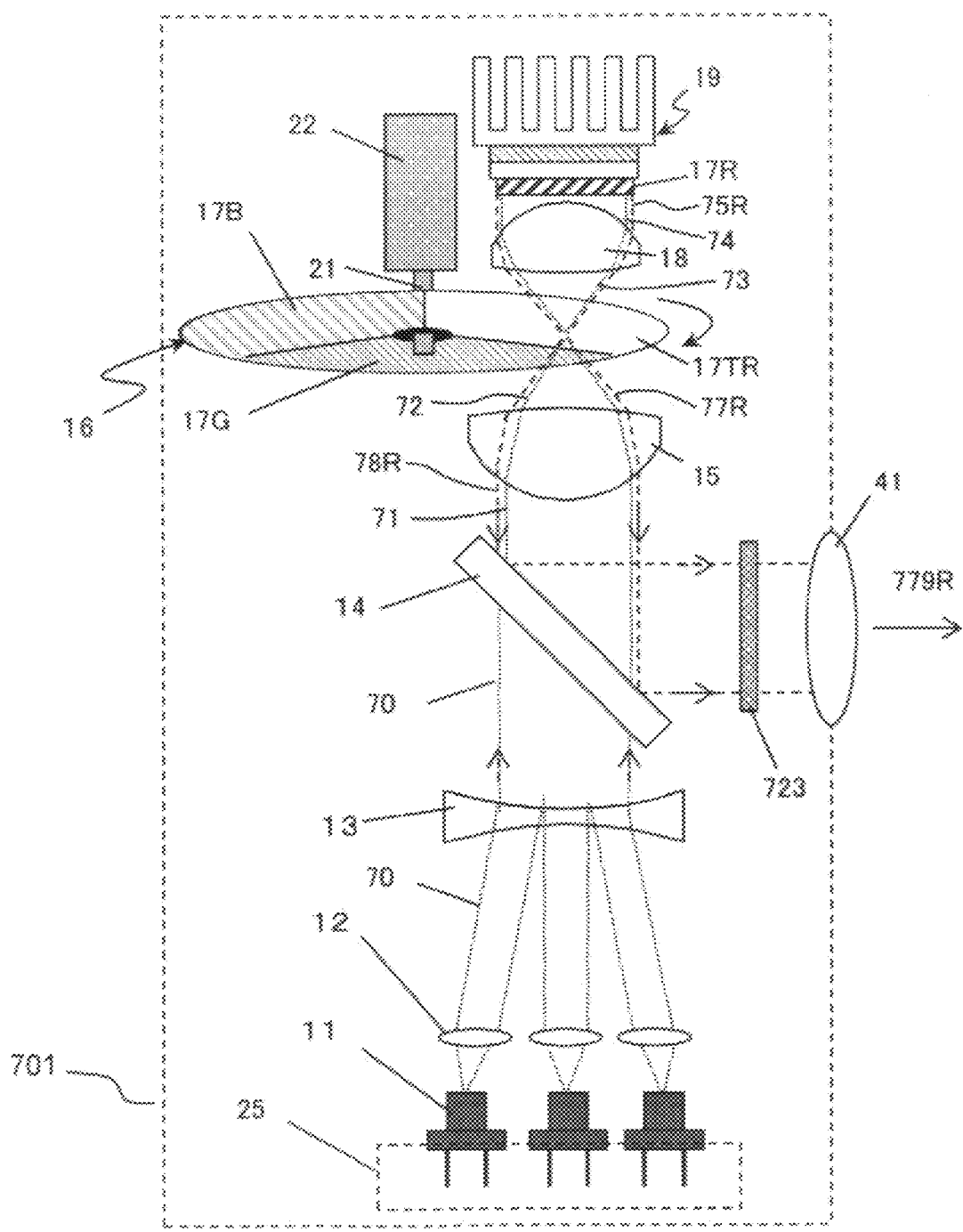
FIG. 20A is a view illustrating a light source and a projection apparatus according to a fourth exemplary embodiment of the present invention.
Figure 20B:
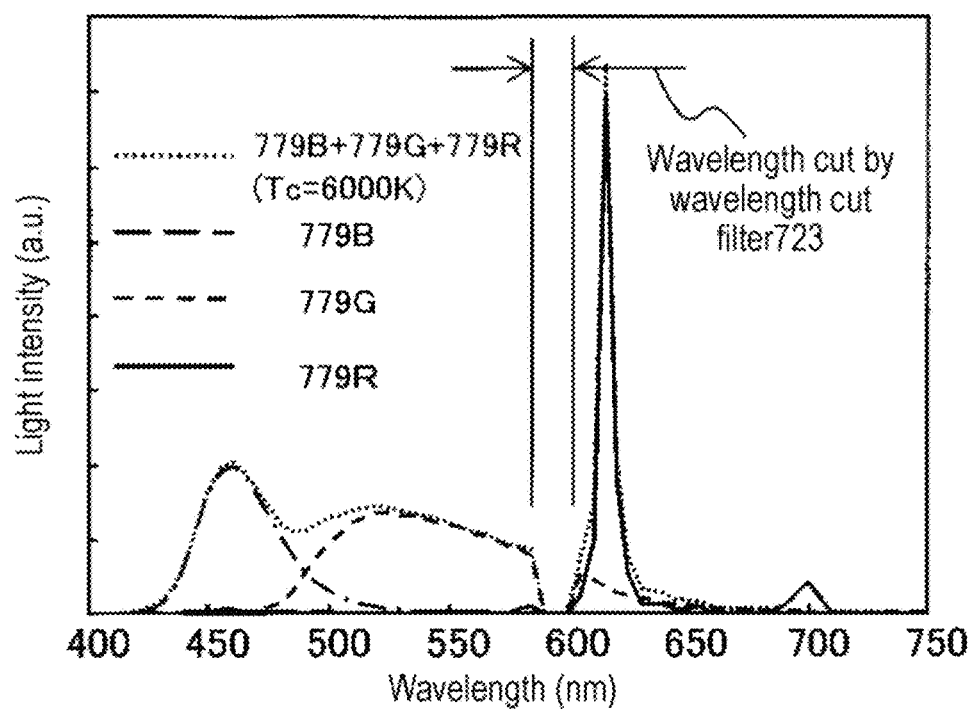
FIG. 20B is a view illustrating a spectrum of the light radiated from a phosphor according to the fourth exemplary embodiment of the present invention.
Figure 20C:
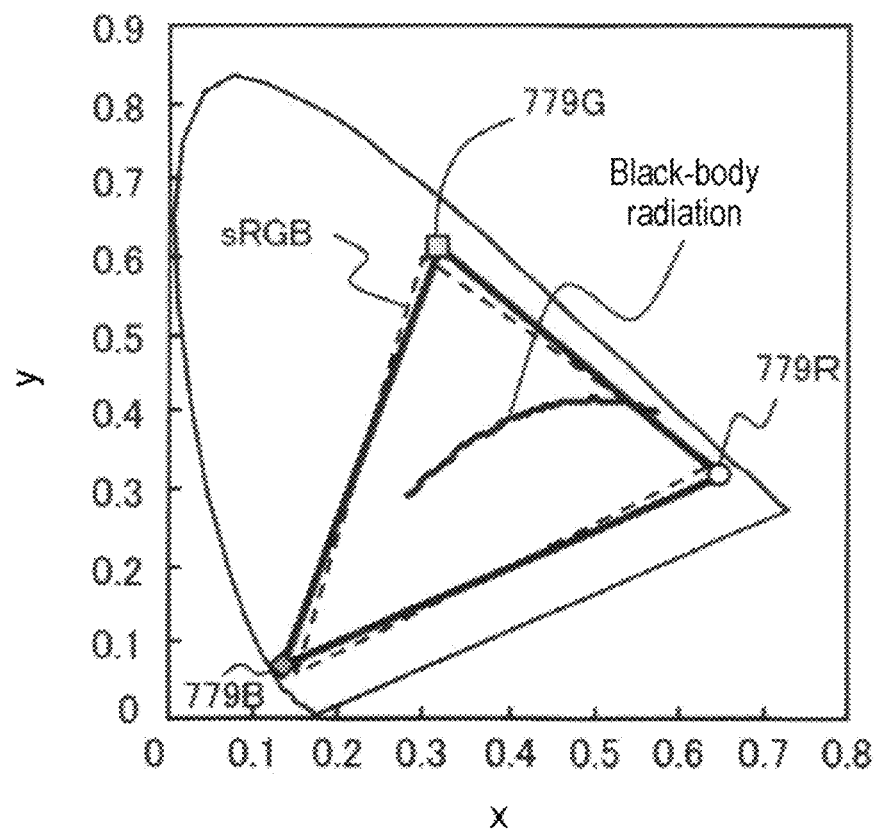
FIG. 20C is a view illustrating chromaticity coordinates of blue light, green light, and red light, which are emitted from a projection lens of the fourth exemplary embodiment of the present invention.

Light source 701 according to a fourth exemplary embodiment of the present invention will be described below with reference to FIGS. 20A to 20C. The basic configuration of the light source of the fourth exemplary embodiment differs from that of light source 101 of the first exemplary embodiment only in that wavelength cut filter 723 is disposed between dichroic mirror 14 and converging lens 41. Therefore, a different portion between the fourth exemplary embodiment and the first exemplary embodiment will mainly be described.

The narrowness of the half-value width of the emission spectrum in the phosphor of first fluorescence emission component 17R is utilized in the fourth exemplary embodiment. For example, it is assumed that wavelength cut filter 723 cuts the light having the wavelengths of 590 nm to 600 nm. As illustrated in FIG. 20B, the light that has the wavelengths of 590 nm to 600 nm to decrease the color purity in the emission spectrum of Eu- and Sm-activated $LaW_3O_{12}$ used in the red phosphor and the light that has the wavelengths of 590 nm to 600 nm to decrease the color purity in the emission spectrum of Ce-activated $Y_3(Al,Ga)_5O_{12}$ used in the green phosphor can be cut by the configuration of the fourth exemplary embodiment. As illustrated in the color space of FIG. 20C, the color reproducibility of light source 701 can be expanded compared with the first exemplary embodiment by this effect.

Thus, the light source of the fourth exemplary embodiment can make the simple-configuration light source having the higher efficiency and the better color reproducibility.

Fifth Exemplary Embodiment

A light source and a image projection apparatus according to a fifth exemplary embodiment of the present invention will be described below with reference to FIGS. 21A to 21D. Because the basic configuration of the light source of the fifth exemplary embodiment is identical to that of the light source of the second exemplary embodiment, a different point between the fifth exemplary embodiment and the second exemplary embodiment will mainly be described.

The configuration of the light source of the fifth exemplary embodiment is substantially identical to that of the second exemplary embodiment illustrated in FIG. 12, and the configuration of the light source of the fifth exemplary embodiment differs from that of the second exemplary embodiment in semiconductor luminescence element 11, second wavelength converting unit 16, and dichroic mirror 14. Semiconductor luminescence element 11 is replaced with semiconductor luminescence element 811 (not illustrated), second wavelength converting unit 16 is replaced with second wavelength converting unit 816, and dichroic mirror 14 is replaced with polarization beam splitter 814 (not illustrated).

Figure 21A:
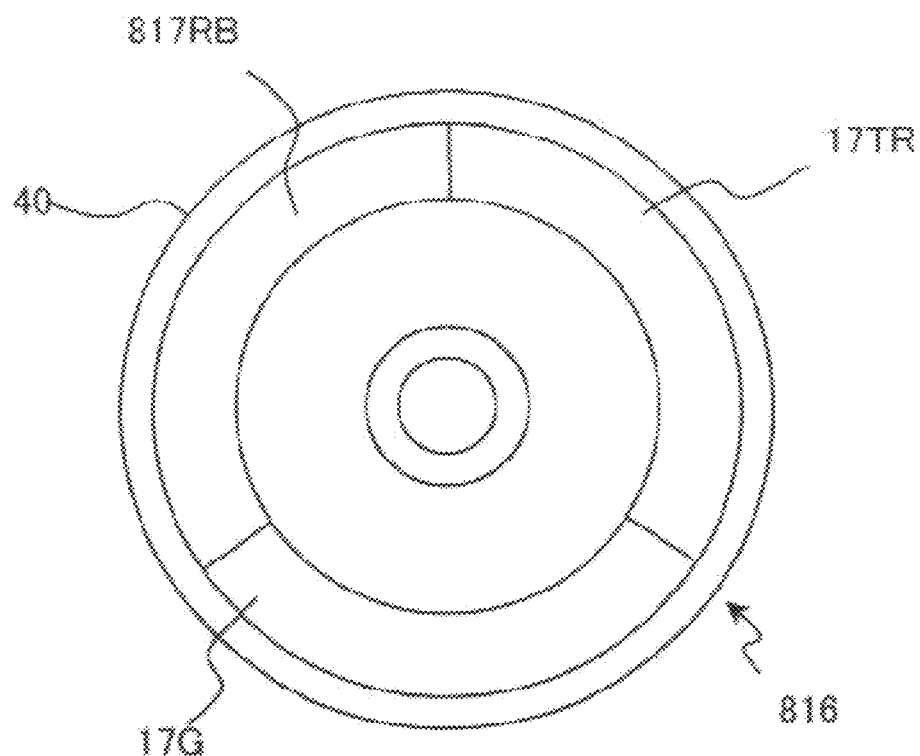
FIG. 21A is a view illustrating a configuration of a second wavelength converting unit according to a fifth exemplary embodiment of the present invention.
Figure 21B:
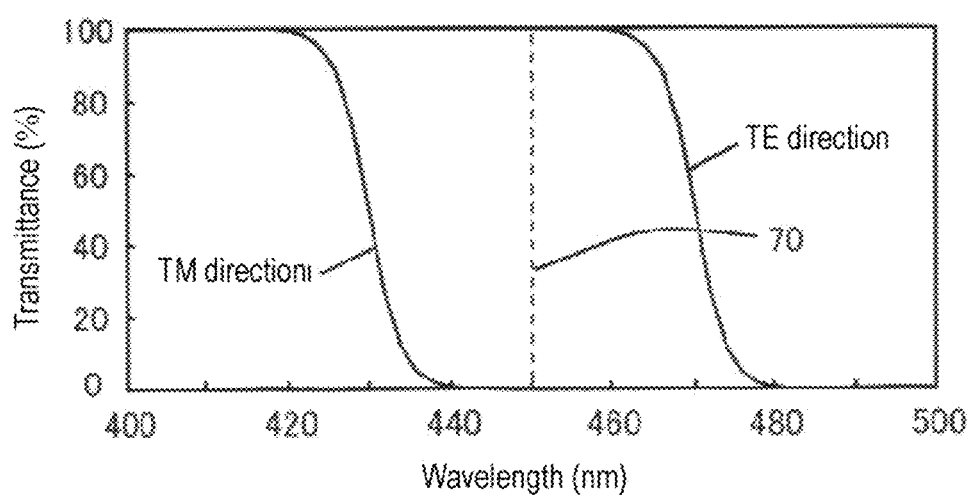
FIG. 21B is a view illustrating a transmission characteristic of a dichroic mirror according to the fifth exemplary embodiment of the present invention.

A semiconductor laser that radiates the output light having the center wavelengths of 430 nm to 500 nm, i.e., so-called blue light, is used as semiconductor luminescence element 811 in the light source of the fifth exemplary embodiment. As to the configuration of second wavelength converting unit 816, as illustrated in FIG. 21A, second fluorescence unit 17G, light transmission region 17TR, and light polarization conversion reflection region 817RB are formed in each region in the vicinity of the predetermined outer periphery of substrate 40 that is, for example, the disc-shaped aluminum alloy plate. For example, a fine irregularity is formed on the surface of substrate 40, an Ag film is formed on the fine irregularity, and a SiO2 film is formed on the Ag film, thereby forming light polarization conversion reflection region 817RB. Polarization beam splitter 814 is made by forming a dielectric multi-layer film on the glass substrate. As illustrated in FIG. 21B, in the transmission characteristic of polarization beam splitter 814, the light having the wavelengths of 470 nm or less is transmitted in a certain direction (TE direction), and the light having the wavelengths of 430 nm or less is transmitted in a direction (TM direction) perpendicular to the TE direction.

Because the light source of the phosphor of the fifth exemplary embodiment is identical to that of the second exemplary embodiment in the operations of second wavelength converting unit 16 and first wavelength converting unit 19 that are provided in second wavelength converting unit 816, only the operation of light polarization conversion reflection region 817RB will be described. The blue light, which is constituted by the TE polarized light emitted from a plurality of semiconductor luminescence elements 811 and has the center wavelength of 445 nm, passes through polarization beam splitter 814, and is converged in each time by first converging lens 16 into one of third fluorescence emission component 17G, light transmission region 17TR, and light polarization conversion reflection region 817RB of second wavelength converting unit 816. At this point, the excitation light that is the TE polarized light applied to light polarization conversion reflection region 817RB is scattered by the fine irregularity structure provided in substrate 40, and reflected as a low-polarization or non-polarization reflected light. The reflected light is converted into the collimated light by first converging lens 15, and the collimated light is applied to dichroic mirror 814. In dichroic mirror 814, as illustrated in the transmission characteristic of FIG. 21B, the TE polarization component is transmitted while the TM polarization component is reflected. Therefore, the blue light of wavelength converting light 79 can be emitted from light source 101 through converging lens 41.

Figure 21C:
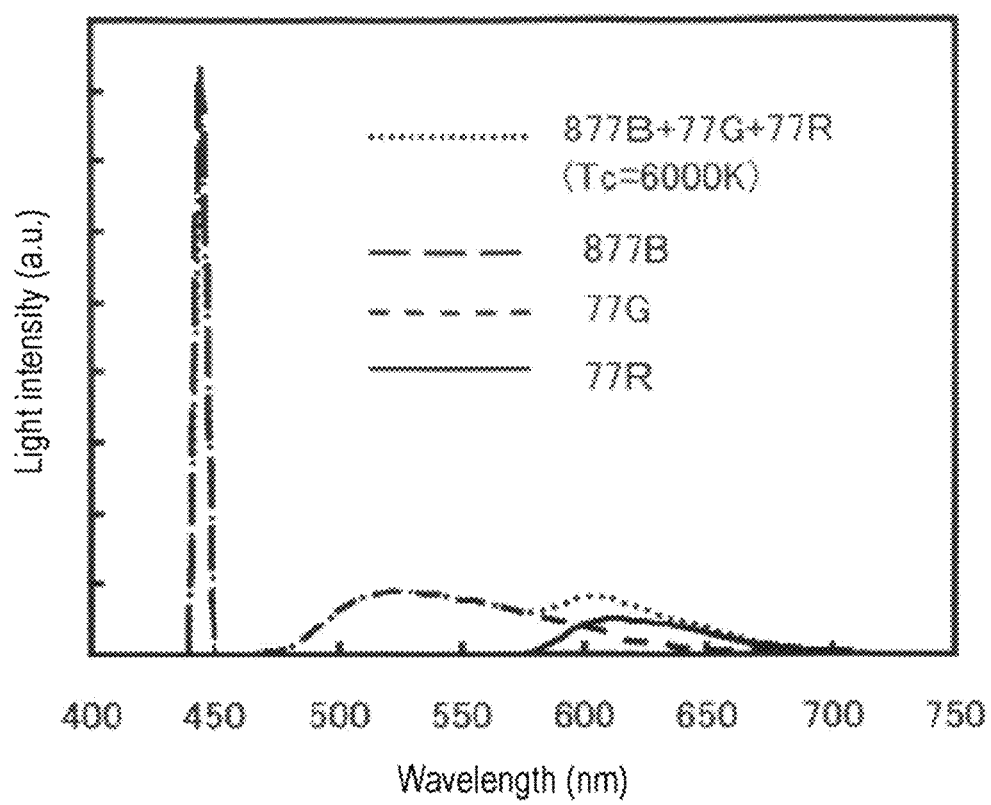
FIG. 21C is a view illustrating a spectrum of wavelength converting light radiated from a light source according to the fifth exemplary embodiment of the present invention.
Figure 21D:
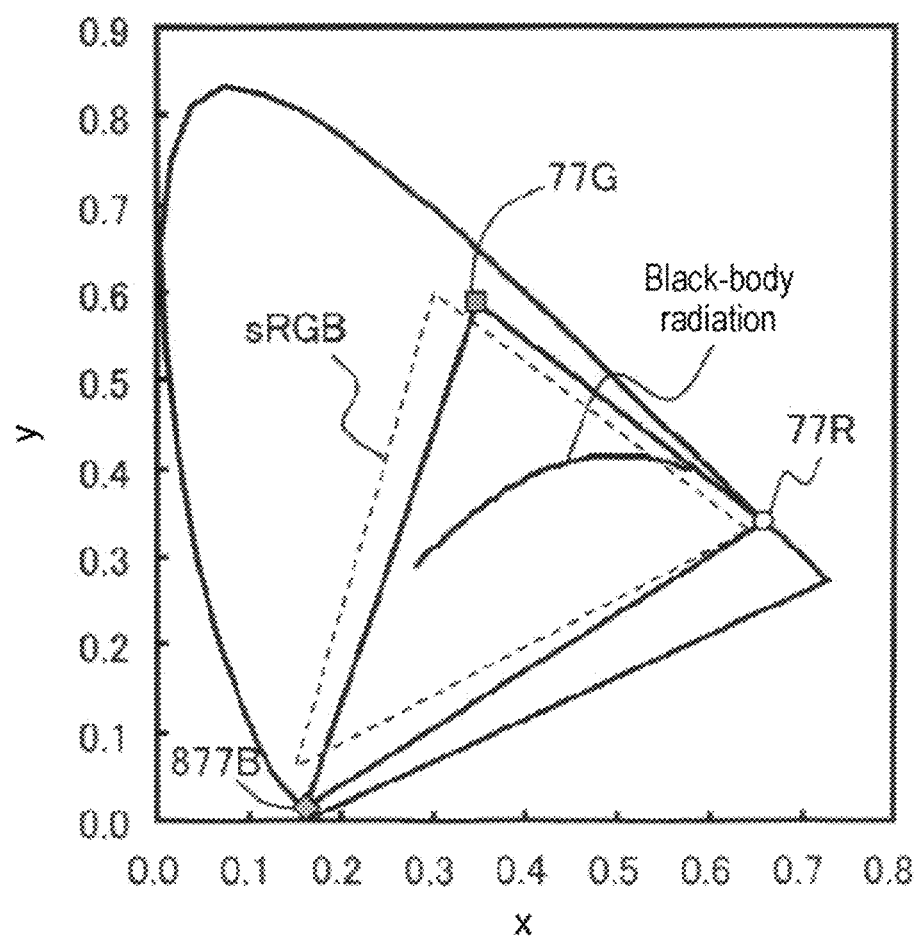
FIG. 21D is a view illustrating chromaticity coordinates of blue light, green light, and red light, which are emitted from a projection lens in the fifth exemplary embodiment.
Figure 22:
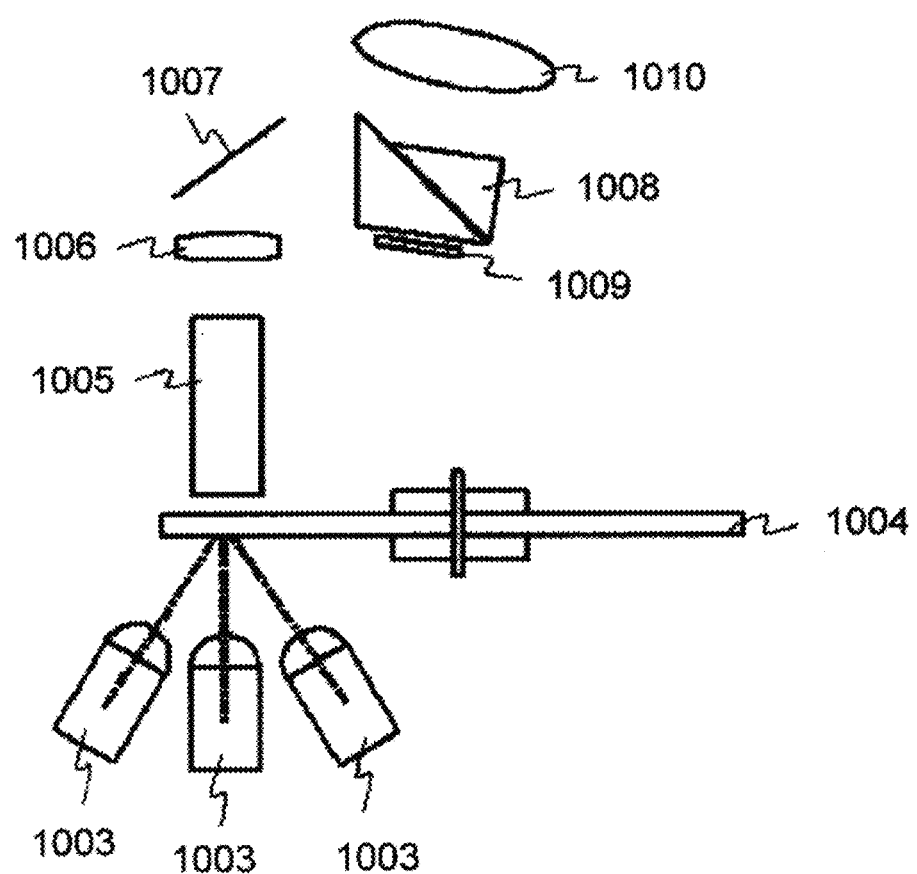
FIG. 22 is a view illustrating a configuration of a conventional light emitting apparatus.

FIGS. 21C and 21D illustrate an example in which the emission spectrum of the light source is designed in this configuration. FIG. 21C illustrates a spectrum of the wavelength converting light emitted from the light source. In the light source, the blue light that is the output light from semiconductor luminescence element 811, the red light that is radiated from first fluorescence emission component 17R to improve the color purity with the wavelength cut filter, and the green light that is radiated from third fluorescence emission component 17G are emitted at constant time intervals, and the white light having the color temperature of 6000K is radiated as the temporally-averaged spectrum.

In the above configuration, the higher-color-reproducibility light source can be provided with space saving and a less number of optical components.

In the fifth exemplary embodiment, the semiconductor laser that radiates the output light having the center wavelengths of 430 nm to 500 nm, i.e., so-called blue light, is used as the semiconductor luminescence element. Alternatively, a super luminescence diode having a small speckle may be used as the semiconductor luminescence element.

In the fifth exemplary embodiment, the light polarization conversion reflection region where the fine irregularity is formed on the surface of substrate 40 is used as light polarization conversion reflection region 817RB. Alternatively, a film in which particles randomly reflecting the output light from the semiconductor luminescence element, for example, $TiO_2$ particles having particle diameters of 10 nm to 20 μm are mixed in a transparent resin or glass may be formed on substrate 40.

Light polarization conversion reflection region 817RB may be made by forming a birefringent material such as quartz on the surface of substrate 40 with a predetermined thickness, and a part or whole of the polarization direction of the incident light may be rotated by 90°.

In the first to fifth exemplary embodiments, one of $Al_2O_3$, AlN, $Ga_2O_3$, $In_2O_3$, ZrO, ZnO, MgO, $SiO_2$, SiON, ITO, GaZnO, and GaInZnO may be used as a material including the first to third fluorescence emission components 17R, 17G, and 17B.

INDUSTRIAL APPLICABILITY

Accordingly, the present invention can provide the light source and the image projection apparatus having the high conversion efficiency and the high color reproducibility without increasing the number of components in the light source that converts the output light emitted from the semiconductor laser into the fluorescent light to radiate the fluorescent light. Therefore, the present invention can widely be applied to not only lighting for display such as the projector, the rear-projection television set, and the headup display but also in-car lighting such as the headlight or medical lighting such as an endoscope.

REFERENCE MARKS IN THE DRAWINGS

1, 101, 401, 601 light source
11 semiconductor luminescence element
12 collimator lens
13 concave lens
14 dichroic mirror
15 first converging lens
16, 816 second wavelength converting unit
17R, 417R, 617R first fluorescence emission component
17G second fluorescence emission component
17B third fluorescence emission component
17TR transmission region
18, 618a, 618b second converging lens
19 first wavelength converting unit
21, 621a, 621b rotation shaft
22, 622 rotation mechanism
23, 423, 723 wavelength cut filter
25 heat sink
40 substrate
41 converging lens
42 rod lens
43 convex lens
45 reflecting mirror
50 image display element
65 projection lens
70 output light
74, 75 excitation light
76, 76R wavelength converting diffused light
75R, 77R, 77G, 77B, 78R, 79 wavelength converting light
80 signal light
89 video light
199 projection apparatus
201 substrate
202 reflecting film
205 on-chip lens
205a microlens array
207 heat radiation component
208 heat radiation substrate
209 heat radiation mechanism
210 heat radiation fin
817RB light polarization conversion reflection region

The invention claimed is:

1. A light source comprising:
at least one semiconductor luminescence element;
a first wavelength converting unit that is disposed away from the semiconductor luminescence element; and
a rotatable second wavelength converting unit disposed between the semiconductor luminescence element and the first wavelength converting unit,
wherein the second wavelength converting unit includes a second wavelength converting region that absorbs output light emitted from the semiconductor luminescence element and radiates second light having a dominant wavelength different from that of the output light, and a transmission region that transmits the output light,
the first wavelength converting unit absorbs the output light to radiate first light having a wavelength longer than the dominant wavelength of the second light, and the first light passes through the transmission region, and
a third wavelength converting region is formed in the second wavelength converting unit, the third wavelength converting region absorbing the output light to radiate third light having a dominant wavelength different from that of the second light.

2. The light source according to claim 1, wherein the first wavelength converting unit includes a first phosphor, and the second wavelength converting unit includes a second phosphor different from the first phosphor.

3. The light source according to claim 1, wherein an emission peak wavelength of the second phosphor is between 500 nm and 600 nm.

4. The light source according to claim 1, wherein an emission peak wavelength of the first phosphor is between 580 nm and 670 nm.

5. The light source according to claim 1, wherein the third wavelength converting region and the second wavelength converting region are formed in an identical surface of the second wavelength converting unit.

6. The light source according to claim 1, wherein the third wavelength converting region includes a third phosphor different from the first phosphor and the second phosphor.

7. The light source according to claim 6, wherein an emission peak wavelength of the third phosphor is between 430 nm and 500 nm.

8. The light source according to claim 1, wherein an emission peak wavelength of the output light is between 360 nm and 430 nm.

9. The light source according to claim 1, further comprising
a dichroic mirror that is provided between the semiconductor luminescence element and a first converging lens,
wherein the dichroic mirror transmits the output light, and reflects the first light, the second light, and the third light.

10. The light source according to claim 1, wherein the first phosphor has a phosphor lifetime longer than or equal to the second phosphor.

11. The light source according to claim 1, wherein the second wavelength converting unit rotates at rotation speed between 2.7 milliseconds per lap and 20 milliseconds per lap.

12. The light source according to claim 1, wherein an activator of the first phosphor includes at least one of $Eu^{3+}$, $Mn^{2+}$, $Mn^{4+}$, and $Sm^{3+}$.

13. The light source according to claim 1, wherein
a lens is disposed between the semiconductor luminescence element and the second wavelength converting unit, and
the output light is converged on the second wavelength converting unit through the lens.

14. The light source according to claim 13, further comprising:
a wavelength cut filter that is provided between the first wavelength converting unit and the second lens,
wherein the wavelength cut filter partially or totally reflects light having wavelengths of 500 nm to 590 nm.

15. The light source according to claim 1, wherein a lens or an internal reflectance paraboloid lens is disposed between the second wavelength converting unit and the first wavelength converting unit.

16. The light source according to claim 1, wherein
a plurality of lens arrays are disposed between the first wavelength converting unit and the second lens, and
the output light is converged into a plurality of irradiation parts of the first wavelength converting unit.

17. The light source according to claim 16, wherein
the first wavelength converting unit includes a plurality of phosphor components containing the first phosphor, and
the plurality of phosphor components are disposed in the plurality of irradiation parts.

18. The light source according to claim 1, wherein an emission peak wavelength of the first phosphor is between 590 nm and 630 nm.

19. An image projection apparatus comprising:
the light source according to claim 1; and
an image display element.

20. The image projection apparatus according to claim 19, wherein the image display element is temporally sequentially irradiated with at least the first light, the second light, and the third light.

21. A light source comprising:
at least one semiconductor luminescence element:
a first wavelength converting unit that is disposed away from the semiconductor luminescence element; and
a rotatable second wavelength converting unit disposed between the semiconductor luminescence element and the first wavelength converting unit,
wherein the second wavelength converting unit includes a second wavelength converting region that absorbs output light emitted from the semiconductor luminescence element and radiates second light having a dominant wavelength different from that of the output light, and
a transmission region that transmits the output light,
the first wavelength converting unit absorbs the output light to radiate first light having a wavelength longer than the dominant wavelength of the second light, and the first light passes through the transmission region, and
a light polarization converting region is formed in the second wavelength converting unit, the light polarization converting region being irradiated with the output light of the semiconductor luminescence element, the output light being reflected as third light having a polarization direction different from that of the output light.

22. The light source according to claim 21, wherein emission peak wavelength of the output light is between 430 nm and 500 nm.

23. The light source according to claim 21, wherein the first wavelength converting unit includes a first phosphor, and the second wavelength converting unit includes a second phosphor different from the first phosphor.

24. The light source according to claim 21, wherein an emission peak wavelength of the second phosphor is between 500 nm and 600 nm.

25. The light source according to claim 21, wherein an emission peak wavelength of the first phosphor is between 580 nm and 670 nm.

26. The light source according to claim 21, wherein an emission peak wavelength of the output light is between 360 nm and 430 nm.

27. The light source according to claim 21, wherein the first phosphor has a phosphor lifetime longer than or equal to the second phosphor.

28. The light source according to claim 21, wherein the second wavelength converting unit rotates at rotation speed between 2.7 milliseconds per lap and 20 milliseconds per lap.

29. The light source according to claim 21, wherein an activator of the first phosphor includes at least one of $Eu^{3+}$, $Mn^{2+}$, $Mn^{4+}$, and $Sm^{3+}$.

30. The light source according to claim 21, wherein
a lens is disposed between the semiconductor luminescence element and the second wavelength converting unit, and
the output light is converged on the second wavelength converting unit through the lens.

31. The light source according to claim 30, further comprising:
a wavelength cut filter that is provided between the first wavelength converting unit and the second lens,
wherein the wavelength cut filter partially or totally reflects light having wavelengths of 500 nm to 590 nm.

32. The light source according to claim 21, wherein a lens or an internal reflectance paraboloid lens is disposed between the second wavelength converting unit and the first wavelength converting unit.

33. The light source according to claim 21, wherein
a plurality of lens arrays are disposed between the first wavelength converting unit and the second lens, and
the output light is converged into a plurality of irradiation parts of the first wavelength converting unit.

34. The light source according to claim 33, wherein
the first wavelength converting unit includes a plurality of phosphor components containing the first phosphor, and
the plurality of phosphor components are disposed in the plurality of irradiation parts.

35. The light source according to claim 21, wherein an emission peak wavelength of the first phosphor is between 590 nm and 630 nm.

36. An image projection apparatus comprising:
the light source according to claim 21; and
an image display element.

37. The image projection apparatus according to claim 36, wherein the image display element is temporally sequentially irradiated with at least the first light, the second light, and the third light.

38. A light source comprising:
at least one semiconductor luminescence element;
a first wavelength converting unit that is disposed away from the semiconductor luminescence element; and
a rotatable second wavelength converting unit disposed between the semiconductor luminescence element and the first wavelength converting unit,
wherein the second wavelength converting unit includes a second wavelength converting region that absorbs output light emitted from the semiconductor luminescence element and radiates second light having a dominant wavelength different from that of the output light, and a transmission region that transmits the output light,
the first wavelength converting unit absorbs the output light to radiate first light having a wavelength longer than the dominant wavelength of the second light, and the first light passes through the transmission region,
a lens is disposed between the semiconductor luminescence element and the second wavelength converting unit,
the output light is converged on the second wavelength converting unit through the lens, and
an irradiation area in which the first wavelength converting unit is irradiated with the output light is larger than an area in which the second wavelength converting unit is irradiated with the output light.

39. The light source according to claim 38, wherein the first wavelength converting unit includes a first phosphor, and the second wavelength converting unit includes a second phosphor different from the first phosphor.

40. The light source according to claim 38, wherein an emission peak wavelength of the second phosphor is between 500 nm and 600 nm.

41. The light source according to claim 38, wherein an emission peak wavelength of the first phosphor is between 580 nm and 670 nm.

42. The light source according to claim 38, wherein an emission peak wavelength of the output light is between 360 nm and 430 nm.

43. The light source according to claim 38, wherein the first phosphor has a phosphor lifetime longer than or equal to the second phosphor.

44. The light source according to claim 38, wherein the second wavelength converting unit rotates at rotation speed between 2.7 milliseconds per lap and 20 milliseconds per lap.

45. The light source according to claim 38, wherein an activator of the first phosphor includes at least one of $Eu^{3+}$, $Mn^{2+}$, $Mn^{4+}$, and $Sm^{3+}$.

46. The light source according to claim 38, wherein a lens or an internal reflectance paraboloid lens is disposed between the second wavelength converting unit and the first wavelength converting unit.

47. The light source according to claim 38, wherein
a plurality of lens arrays are disposed between the first wavelength converting unit and the second lens, and
the output light is converged into a plurality of irradiation parts of the first wavelength converting unit.

48. The light source according to claim 47, wherein
the first wavelength converting unit includes a plurality of phosphor components containing the first phosphor, and
the plurality of phosphor components are disposed in the plurality of irradiation parts.

49. The light source according to claim 38, further comprising:
a wavelength cut filter that is provided between the first wavelength converting unit and the second lens,
wherein the wavelength cut filter partially or totally reflects light having wavelengths of 500 nm to 590 nm.

50. The light source according to claim 38, wherein an emission peak wavelength of the first phosphor is between 590 nm and 630 nm.

51. An image projection apparatus comprising:
the light source according to claim 14; and
an image display element.

52. The image projection apparatus according to claim 51, wherein the image display element is temporally sequentially irradiated with at least the first light, the second light, and the third light.

* * * * *